(12) United States Patent
Kandamkulathy

(10) Patent No.: US 10,860,178 B1
(45) Date of Patent: Dec. 8, 2020

(54) TASK MANAGEMENT THROUGH SOFT KEYBOARD APPLICATIONS

(71) Applicant: Shabu Ans Kandamkulathy, Dubai (AE)

(72) Inventor: Shabu Ans Kandamkulathy, Dubai (AE)

(*) Notice: Subject to any disclaimer, the term of this patent is extended or adjusted under 35 U.S.C. 154(b) by 0 days.

(21) Appl. No.: 16/561,115

(22) Filed: Sep. 5, 2019

(51) Int. Cl.
*G06F 3/0482* (2013.01)
*G06F 3/0484* (2013.01)
*G06F 3/0488* (2013.01)

(52) U.S. Cl.
CPC ........ *G06F 3/0482* (2013.01); *G06F 3/04847* (2013.01); *G06F 3/04883* (2013.01)

(58) Field of Classification Search
CPC .............. G06F 3/0488; G06F 3/04883; G06F 3/04886; G06F 9/451; G06F 3/04812; G06F 3/04815; G06F 3/0482; G06F 8/65
See application file for complete search history.

(56) References Cited

U.S. PATENT DOCUMENTS

| | | | | |
|---|---|---|---|---|
| 2002/0032729 A1* | 3/2002 | Erickson | ................ | G06Q 40/04 709/204 |
| 2004/0109013 A1* | 6/2004 | Goertz | ................. | G06F 3/0488 715/702 |
| 2005/0227216 A1* | 10/2005 | Gupta | ...................... | G09B 7/00 434/322 |
| 2012/0216146 A1* | 8/2012 | Korkonen | ............. | G06F 3/0482 715/835 |
| 2013/0290234 A1* | 10/2013 | Harris | .................... | G06N 5/022 706/46 |
| 2014/0297876 A1* | 10/2014 | Aquilina | ............... | H04L 67/141 709/227 |
| 2017/0330120 A1* | 11/2017 | Zhang | .................. | G06Q 10/109 |
| 2019/0179503 A1* | 6/2019 | Lu | ......................... | G06F 3/0481 |

* cited by examiner

*Primary Examiner* — Maryam M Ipakchi
(74) *Attorney, Agent, or Firm* — Silver Legal LLC; Jarrett L. Silver

(57) ABSTRACT

The present disclosure provides examples which describe systems and methods associated with a computing device that might have one or more processors and a presence-sensitive display, which will execute a keyboard application to output a soft keyboard including a plurality of keys and a task management element; receive an indication of a selection of the task management element, and, responsive to receiving the indication of the selection of the task management element, output, within the soft keyboard, different methods for the user to allow for the input, selection and viewing of tasks. The keyboard application may, based on an indication of the selection of the method used, create and modify tasks, and in some cases, allow the user to view tasks within the soft keyboard. Other examples are also described.

20 Claims, 17 Drawing Sheets

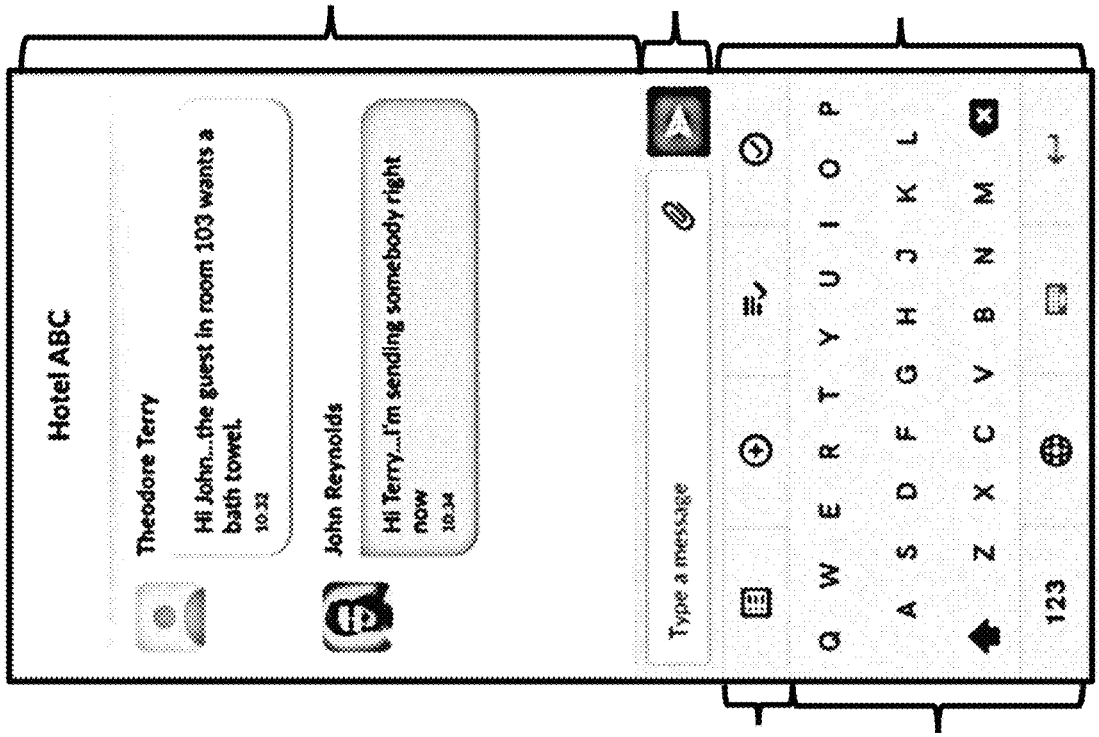

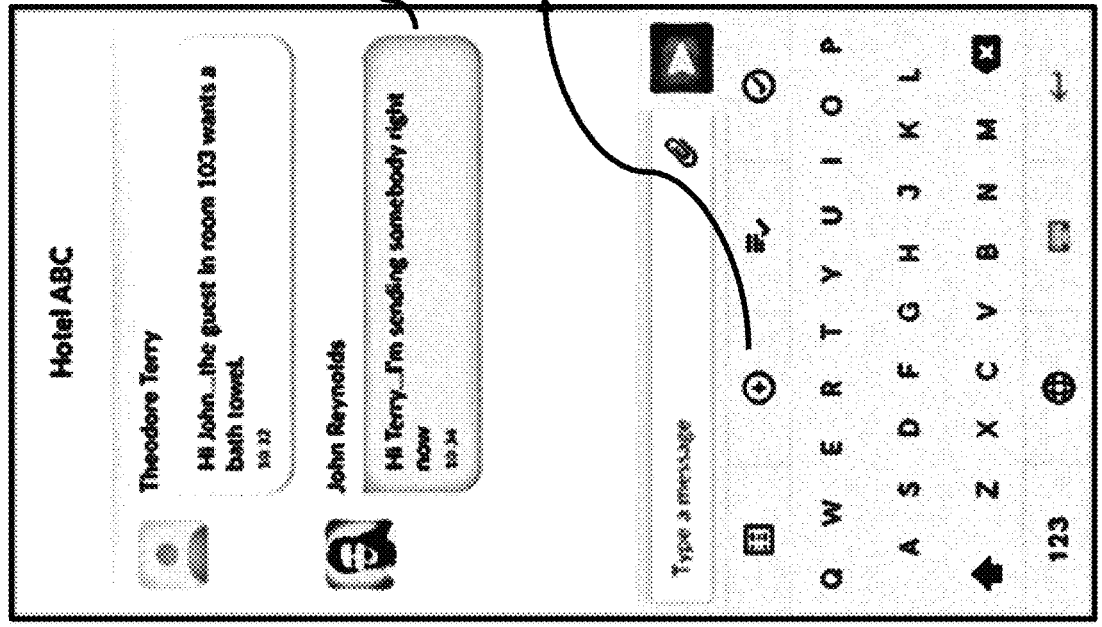
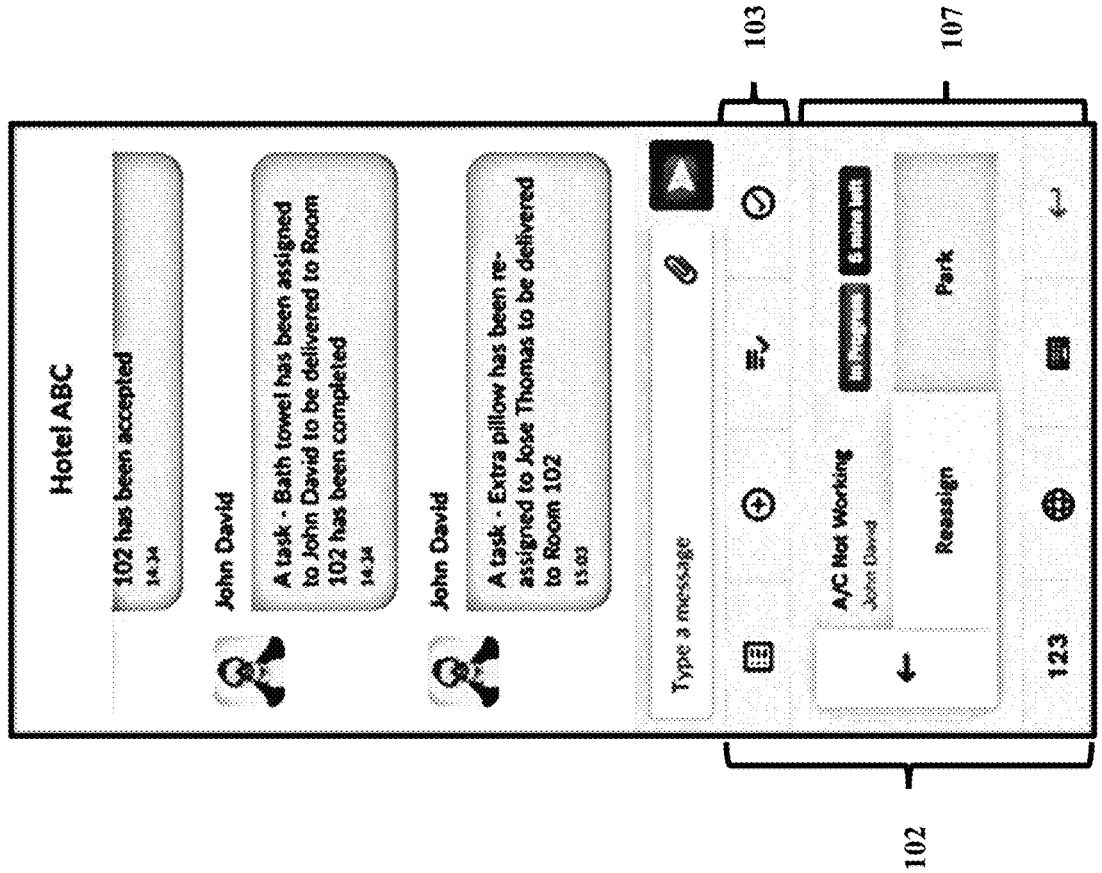

TASK MANAGEMENT THROUGH SOFT KEYBOARD APPLICATIONS

BACKGROUND OF THE INVENTION

Messaging applications has now become the de facto method of communication in one's personal life. The extent of usage has increased to such an extent that those very same applications are now being used to connect with each other in the business world. This transition has mainly happened since everyone has the same application, its free of cost, the user is comfortable with using it and has the critical ability to stay connected with each other. However, this has bought about the additional complication of managing different tasks that arise in the business world. The absence of workflows within most messaging applications make managing tasks within a messaging application cumbersome. Relying on separate task management applications in computing devices requires the users to toggle between the messaging application and the task management application leading to users abandoning or relying less on such separate task management applications in many businesses. This ultimately affects management of business tasks as every task becomes part of a conversation and hence, not trackable.

SUMMARY OF THE INVENTION

Therefore, there is a need for improved methods and interfaces which complement the conventional methods for messaging to enable the user to manage tasks in the same application without having the necessity to toggle between applications. Such methods and interfaces reduce or change the number, extent, and/or nature of the inputs from a user and produce a more efficient human-machine interface.

In accordance with some embodiments, applying a method which includes outputting a soft keyboard application executing at a computing device, which includes a plurality of keys and a task management element, to be used in conjunction with any messaging application, chat application, communication application or any social messaging platform (collectively referred to as "CA" in this disclosure) which is executed at the same computing device. Responsive to receiving the indication of the selection of the task management element, outputting, for display within the soft keyboard, a user input region along with a suggestion region to select pre-configured parameters to create and modify tasks, and/or a user selection region to create, manage or view tasks; determining, based on an indication of a user input detected by the computing device, a task action; invoking the task action; responsive to invoking the task action, a task is created or modified within the keyboard application, in a separate task management application in the same computing device or in a task management application in a remote computing device, or in some instances the results can be viewed within the soft keyboard application; and to optionally update, for display, within a text edit region of the of the CA, a sentence that describes the result of the invoked action, which can be sent by the user of the CA.

In accordance with some embodiments, a computing device includes one or more processors, a memory storing one or more applications including a keyboard application, and a presence-sensitive display. The one or more processors execute the keyboard application to output, for display by the presence-sensitive display, a soft keyboard application executing at a computing device, which includes a plurality of keys and a task management element, to be used in conjunction with a CA which is executed at the same computing device. Responsive to receiving the indication of the selection of the task management element, outputting, for display by the presence-sensitive display within the soft keyboard, a user input region along with a suggestion region to select pre-configured parameters to create and modify tasks, and/or a user selection region to create, manage or view tasks; determining, based on an indication of a user input detected by the computing device, a task action; invoking the task action; responsive to invoking the task action, a task is created or modified within the keyboard application, in a separate task management application in the same computing device or in a task management application in a remote computing device, or in some instances the results can be viewed for display by the presence-sensitive display within the soft keyboard application; and to optionally update, for display by the presence-sensitive display, within a text edit region of the of the CA, a sentence that describes the result of the invoked action, which can be sent by the user of the CA.

In accordance with some embodiments, a computer-readable storage medium encoded with instructions that, when executed, cause one or more processors of a computing device to output a soft keyboard application executing at a computing device, which includes a plurality of keys and a task management element, to be used in conjunction with any CA application which is executed at the same computing device. Responsive to receiving the indication of the selection of the task management element, outputting, for display within the soft keyboard, a user input region along with a suggestion region to select pre-configured parameters to create and modify tasks, and/or a user selection region to create, manage or view tasks; determining, based on an indication of a user input detected by the computing device, a task action; invoking the task action; responsive to invoking the task action, a task is created or modified within the keyboard application, in a separate task management application in the same computing device or in a task management application in a remote computing device, or in some instances the results can be viewed within the soft keyboard application; and to optionally update, for display, within a text edit region of the of the CA, a sentence that describes the result of the invoked action, which can be sent by the user of the CA.

Thus, the soft keyboard application executing at a computing device, which includes all the above embodiments, allows the users to not only message using their favorite messaging application, but also at the same time allow the users the flexibility to manage tasks with other users without ever having to leave the messaging application, thereby increasing the effectiveness, efficiency, and user satisfaction with such applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of the non-limiting examples will be set forth in part in the description which follows and, in part, will be apparent from the description, or may be learned by practice of the disclosure.

The details of the non-limiting examples are set forth in the accompanying drawings and the description below. Other features, objects, and advantages of the disclosure will be apparent from the description and drawings, and from the claims.

BRIEF DESCRIPTION OF THE DRAWINGS

Non-limiting and non-exhaustive examples are described with reference to the following figures.

FIG. 1 is a conceptual screen layout illustrating an example computing device that is configured to present a soft keyboard with task management features, in accordance with one or more aspects of the present disclosure.

FIG. 2 is a conceptual screen layout illustrating an example computing device that is configured to present a soft keyboard with task management features, which illustrates the user input method and the user suggestion region wherein the pre-configured parameters are shown to help the user during the input process, in accordance with one or more aspects of the present disclosure.

FIG. 3 is a conceptual screen layout illustrating an example computing device that is configured to present a soft keyboard with task management features, which illustrates the user selection and view region within the soft keyboard, in accordance with one or more aspects of the present disclosure.

FIGS. 4A-4I, collectively "FIG. 4", are conceptual sequential screen layouts illustrating an example computing device that is configured to present a soft keyboard with task management features, which illustrates the process of task creation, in accordance with one or more aspects of the present disclosure.

DETAILED DESCRIPTION

Figure 4C:
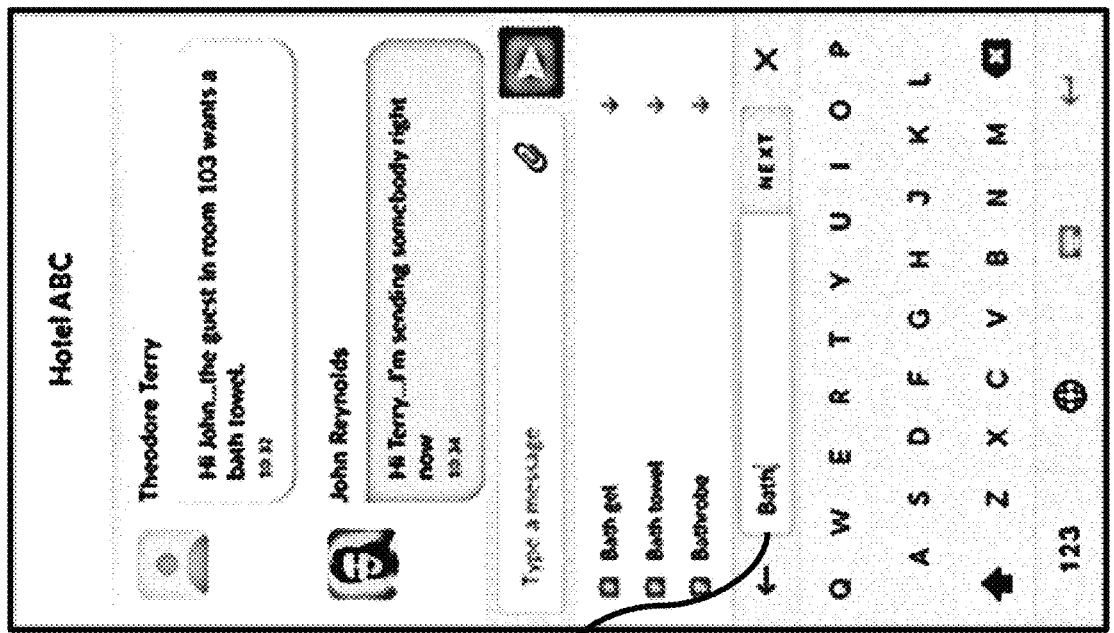
Figure 4B:
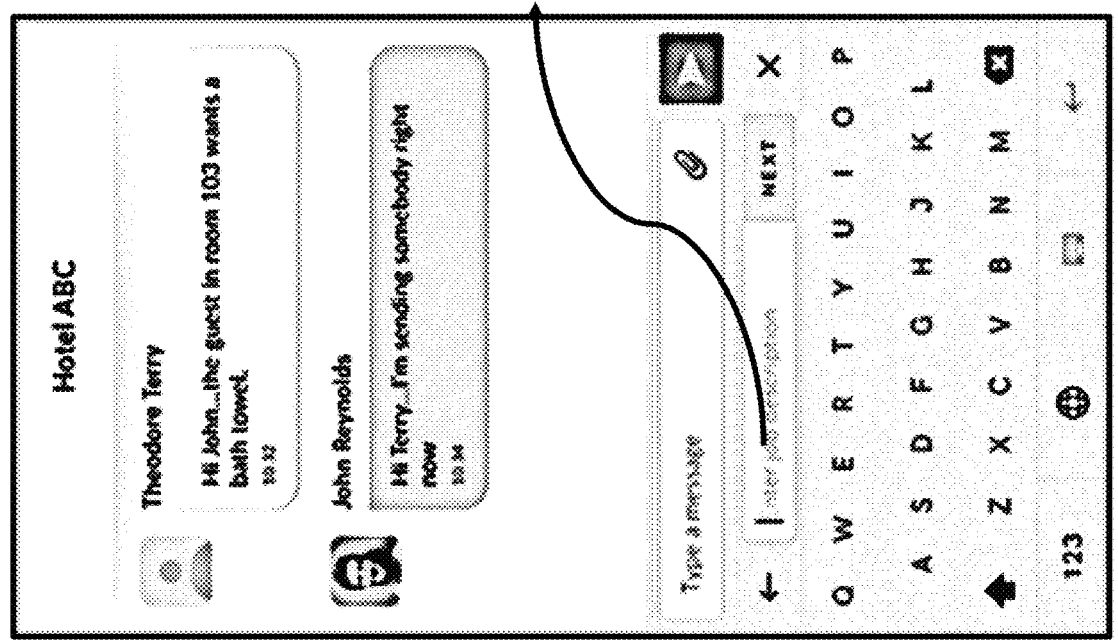
Figure 4D:
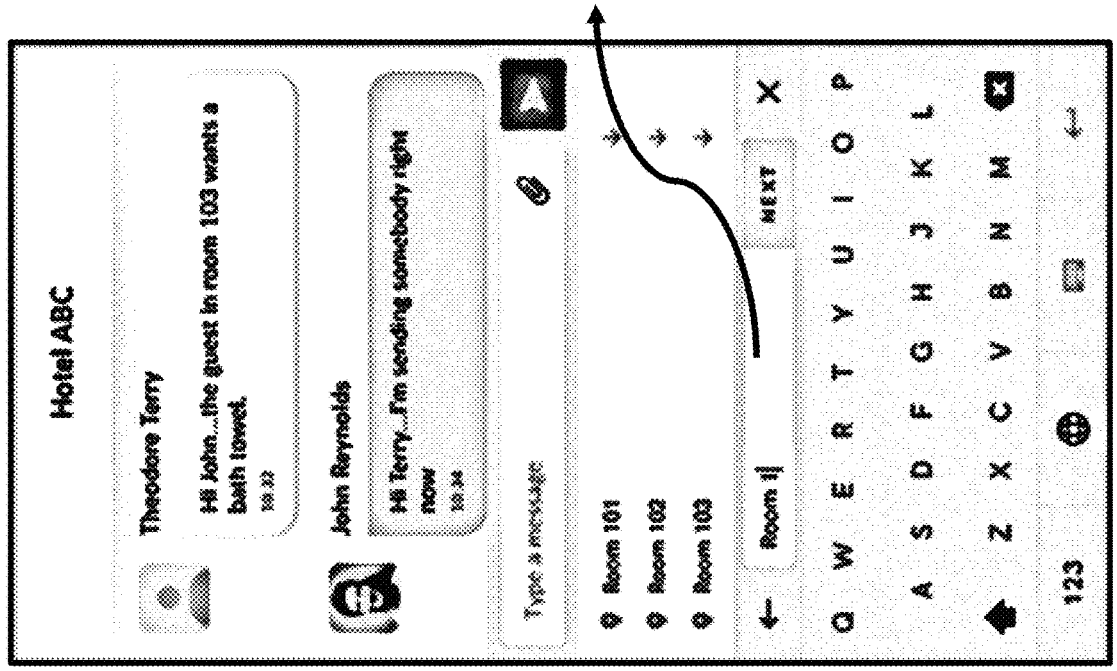
Figure 4E:
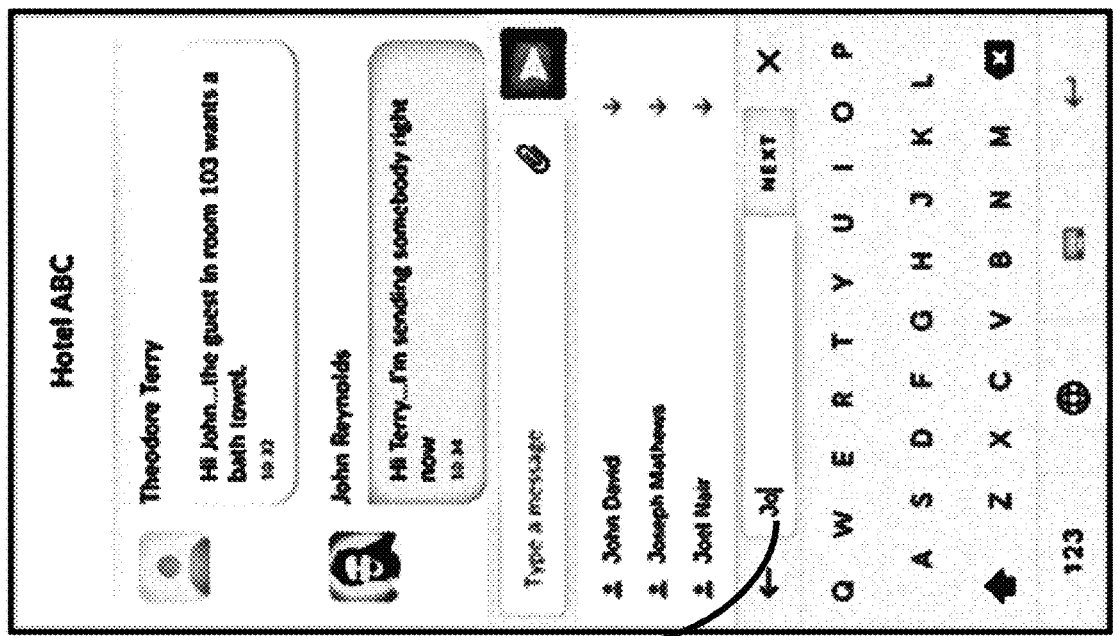
Figure 4G:
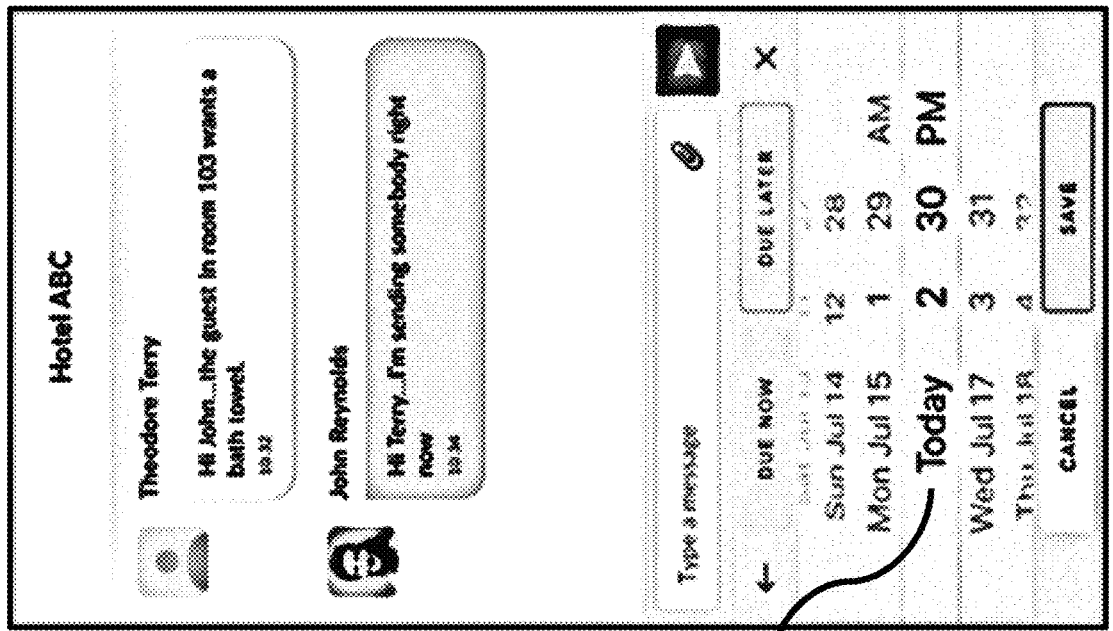
Figure 4F:
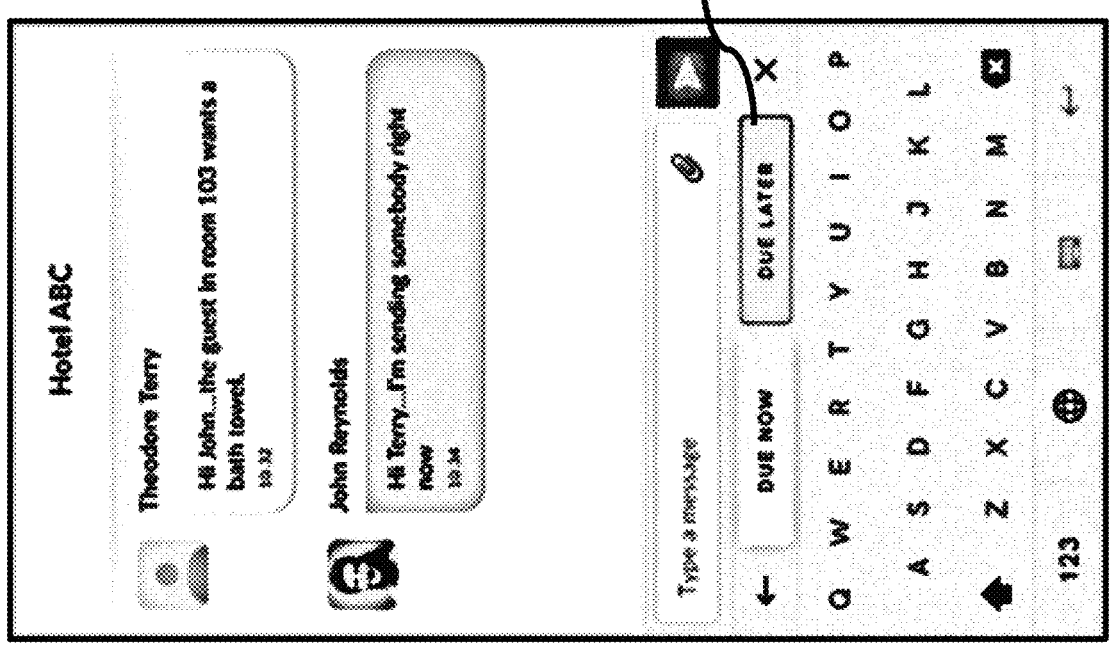
Figure 4H:
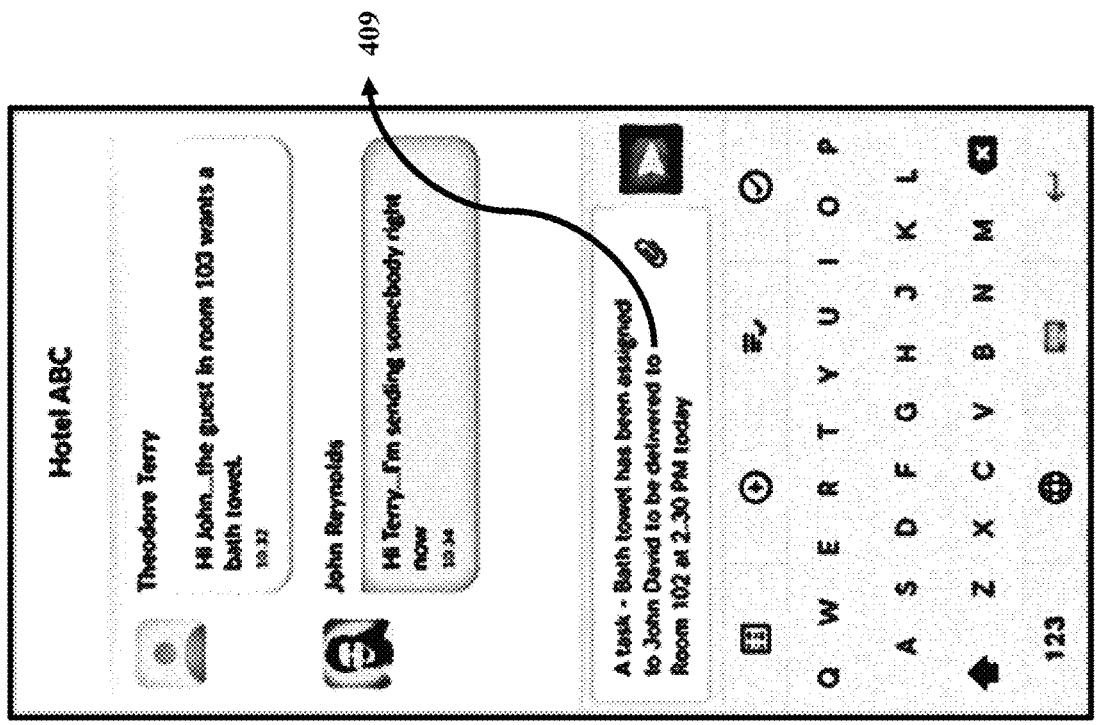
Figure 4I:
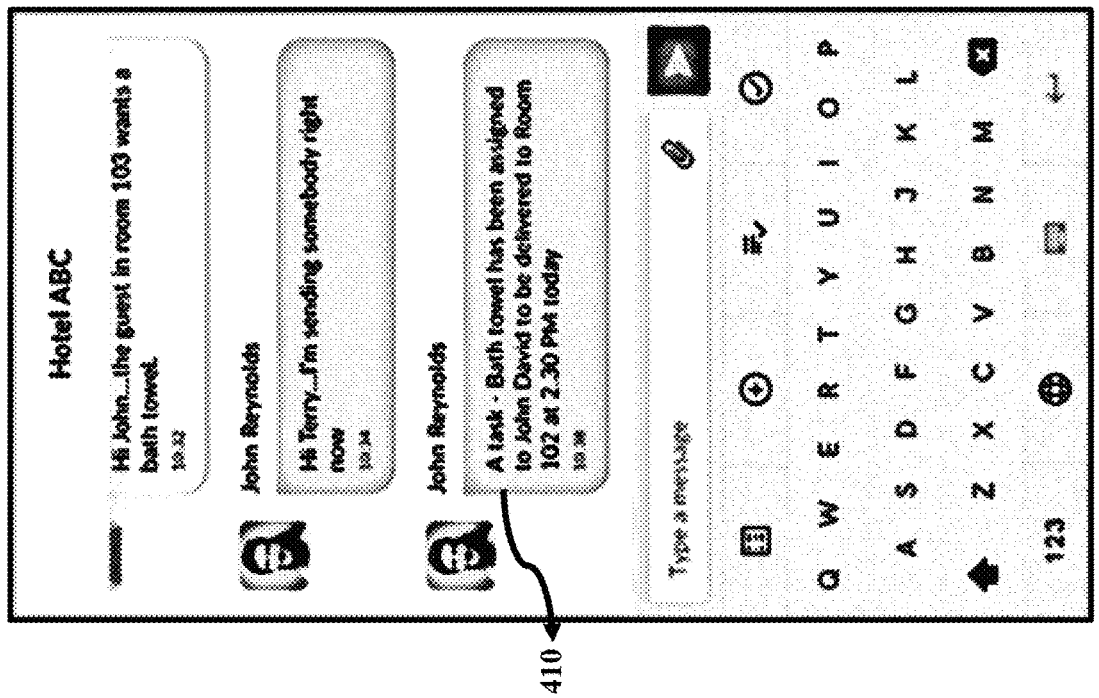

This disclosure is generally aimed at different methods wherein a keyboard application, which is executed at a computing device allows a user to manage tasks within the soft keyboard of the keyboard application. This keyboard application is expected to be used in conjunction with any messaging application, chat application, communication application or any social messaging platform (hereinafter referred to as "CA") available for the user. If the user is interested in creating or modifying a task, then the keyboard application allows the user to do so without leaving the CA that is currently being used. In some examples, the task management application is inbuilt within the keyboard application, while in other examples, the keyboard application will be linked to another task management application within the same computing device or to a task management application remote of the computing device.

Some of the task management functionalities to be done within the keyboard application will involve showing the results of the actions to be displayed as part of or, in place of a portion or, all of the soft keyboard by the keyboard application.

This allows the user to manage tasks within the CA without having to switch between different applications or re-type text already input at the soft keyboard.

As the keyboard application provides task management capability, rather than requiring a user of a computing device to navigate away from the current interface, the keyboard application may operate in task management mode in which keyboard application provides the ability to create and manage tasks and present results of such actions within the same region at which soft keyboard 102 is displayed. Keyboard module may include interfaces for communicating with a separate task management application or resource that receives task management action parameters from the keyboard application and returns results.

The methods described in this disclosure allows the user to reduce the amount of time and the number of user inputs required to create and manage tasks, which may, amongst other benefits, simplify the user experience and increase efficiency.

In one or more examples, the functions described may be implemented in hardware, software, firmware, or any combination thereof.

Various examples have been described. These and other examples are within the scope of the claims made in this disclosure.

FIG. 1, FIG. 2 AND FIG. 3 are conceptual diagrams illustrating an example computing device that is configured to output a soft keyboard with task management features, in accordance with different aspects of this disclosure. This computing device may represent any mobile device, such as a smart phone, a tablet computer or any device that may output a soft keyboard for display in any application executed at that computing device.

The keyboard application may detect a touch and non-touch input, as well as detect an input by detecting one or more gestures from a user of a computing device.

FIG. 1, FIG. 2 AND FIG. 3 is an example of a chat user interface of a CA, that includes (or accesses the services of) a keyboard application with task management features. In these examples, the chat user interface includes an output region 100, a text edit region 101, with the keyboard application presenting the soft keyboard 102 for the user to provide input, so as to produce textual characters within edit region 101 that form the content of the electronic messages displayed within output region 100. The messages displayed within output region 100 form a chat conversation between a user of the computing device and a user of a different computing device.

In some examples, region 100 is a user interface for a first application that is separate and distinct from a keyboard application that provides the soft keyboard 102. In such examples, the first application utilizes the services of the keyboard application for certain input and output functions, including text and symbol entry, text and symbol display, text and symbol entry editing, attachment selection, process invocation (such as spell checking, font and style changes, etc.), transmission and receipt controls, etc. Furthermore, the keyboard application can implement task management functionality, and in some examples provide that task management functionality, or results of that task management functionality, to the first application.

The Keyboard application represents an application, service, or component executing at or accessible to computing device that provides the computing device with a soft keyboard 102 having task management features. Keyboard application may switch between operating in text-entry mode in which keyboard application functions similar to a traditional soft keyboard, or task management mode in which keyboard application performs various task management functions or interfaces with one or more task management applications or functionality. The Keyboard application may, for example, receive task management queries or output results for display in place of at least a portion of soft keyboard 102 (e.g., in place of one or more keys of plurality of graphical keys 104).

In some examples, keyboard application may be a stand-alone application, service, or module executing at a computing device. In other examples, keyboard application may be a sub-component or extension acting as a service for other applications or device functionality. For example, keyboard application may be integrated into a CA executing at a computing device. As another example, keyboard application may be a stand-alone application or subroutine that is invoked by an application or operating platform of computing device any time an application or operating platform requires soft keyboard input functionality. In some examples, computing device may download and install keyboard application from an application repository of a service provider (e.g., an online application store accessible via the Internet). In other examples, keyboard application may be preloaded during production of computing device.

When operating in text-entry mode, keyboard application of computing device may perform traditional, soft keyboard operations used for text-entry in any other application. Based on the inputs received in the graphical keys 104, the keyboard application may predict or autocorrect words and/or phrases determined based on the characters associated with the selected graphical keys 104.

The Keyboard application may include a spatial model that may determine, based on the locations of keys and the information about the input, the most likely one or more graphical keys 104 being selected. Responsive to determining the most likely one or more graphical keys 104 being selected, keyboard application may determine one or more characters, words, and/or phrases. In some examples, keyboard application may apply a language model to the sequence of characters to determine one or more likely candidate letters, morphemes, words, and/or phrases that a user is trying to input based on the selection of graphical keys 104.

The Keyboard application may reconfigure soft keyboard 102 to invoke task management features as opposed to mere text entry operations to text edit region 101. For example, the keyboard application can include a choice of task management functions 103 which is laid out within the soft keyboard 103. By selecting one of the task management functions 103, the keyboard application may replace the task management functions 103 with an input region 106, to allow the user to input the parameters of any given task.

In response to any such input within the input region 106, the keyboard application will show suggested options available for input in the suggestion region 105. Such suggestions will be from a list which has already been pre-configured within such a task management application.

In some examples, in response to a selection of any of the task management functions 103 laid out within the soft keyboard 102, the keyboard application may replace the traditional keyboard with a selection region 107 through which the user can create, manage and view tasks of the task management application.

In some examples, the selection region 107 may alternatively be shown to display results of the users selection. These results may be showed within the selection region 107 in different types of views (list based, card based, calendar based etc.) and the user interface may be configured to switch between respective view-based user interface elements in response to determining a user gesture, e.g., a swipe gesture or a user selection.

In other examples, in response to a selection of any element within any of the views of the results displayed in selection region 107, the keyboard application may be configured to automatically, output an indication of information related to the view in text edit region 101. The information related to the view element may include, for example, text, a hyperlink, an image etc. In this way, the computing device is configured to allow one-gesture input of information from the selection region 107 to the text edit region 101, enabling easy and efficient entry of information.

In order to avoid any confusion, all the view elements, in the selection region 107, being described relate to an already existing information about a specific task or a set of tasks within the task management application.

The keyboard application may start operating in a task management mode in response to any user input to one of the task management functions 103. In some examples, while keyboard application is operating in task management mode, the keyboard application may still enable text entry via graphical keys 104.

In some examples, the layouts of the input region 106 can be in the form of pre-configured dropdown lists which the user can use to select a specific task management parameter. In such cases, the suggestion region 105 may or may not be shown.

In some examples, the layout of the task management functions 103 may not at the top of the soft keyboard 102 but may be shown in the bottom of the soft keyboard.

In other examples, the layout of all the components 103, 104, 105, 106 and 107 can change depending on the type of the computing device being used or the orientation view selected by the user (for example, Mobile phone, tablet, portrait view, landscape view etc.)

In other examples, the task management functions 103 may not be limited to four options but can increase and decrease depending on user requirement.

FIG. 4 is an example of a method which allows for a keyboard application, which is executed at a computing device, to allow a user to create a task within the soft keyboard of the keyboard application.

In response to a request in the messaging application 401, to create a task, the user clicks on the task management element 402 of the soft keyboard 102. In response to receiving the indication of the selection of the task management element, the keyboard application will output, for display within the soft keyboard 102, a user input region 403, 404, 405, 406 and 407 to input the different parameters of the task, within the soft keyboard 102 and in place of at least a portion of the plurality of keys.

An example of how the User Input region can be used to input the different parameters of the task would be to specify what the task should be 404, where the task has to be done 405, who has to do it 406 and when it has to be done 407. There are examples where the keyboard application will output, for display within the soft keyboard 102, in place of at least a portion of the plurality of the keys, a selection region 408 where the user can specify the exact time and day the task should be done. There can be other examples where the keyboard application needs to reconfigure the keyboard 102 in a way to fit in any other specific form of input.

In response to invoking the create task action, by the keyboard application, a task is created in the Task management application which can be within the keyboard application, in a separate task management application in the same computing device or in a task management application in a remote computing device. At the same time, a message may be formed in the text edit region 409 detailing the exact event that has been triggered in the task management application for the user to send to user(s) of a CA. If the user chooses to send the message from the CA 410, the message is now seen by the user(s) of the CA that a task has been newly created.

A message may be automatically formed in the text edit region 409 in every case, whenever a task event is triggered, which explains the details and contents of that triggered task action. However, this automatic formation of the message may be suppressed based on user or application level configurations.

Figure 5B:
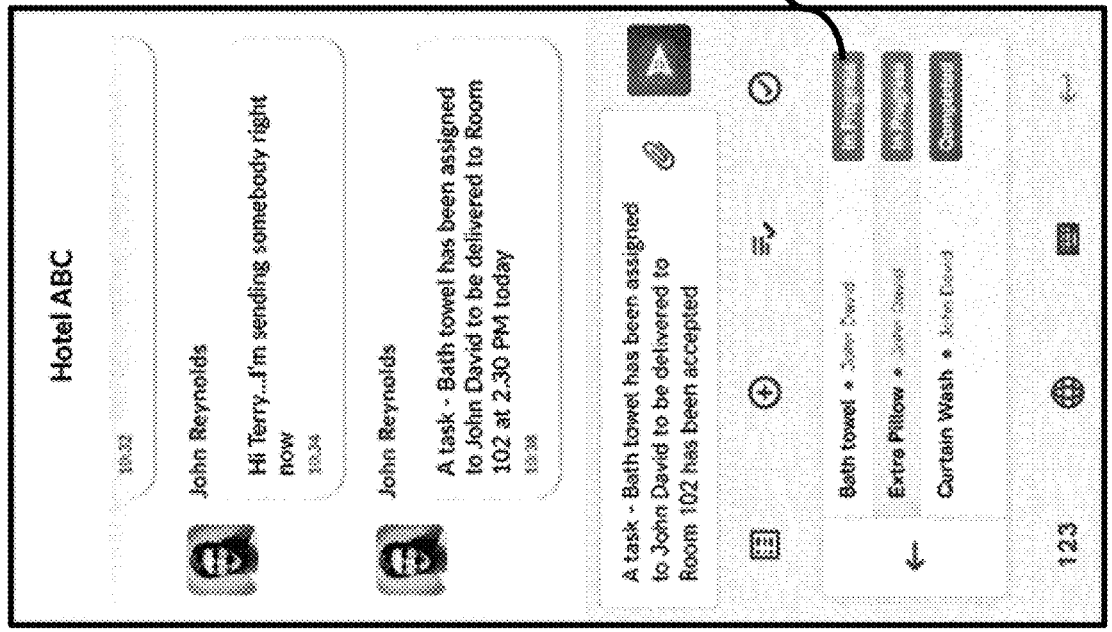
FIGS. 5A-5C, collectively "FIG. 5", are conceptual sequential screen layouts illustrating an example computing device that is configured to present a soft keyboard with task management features, which illustrates the process of accepting a task, in accordance with one or more aspects of the present disclosure.
Figure 5A:
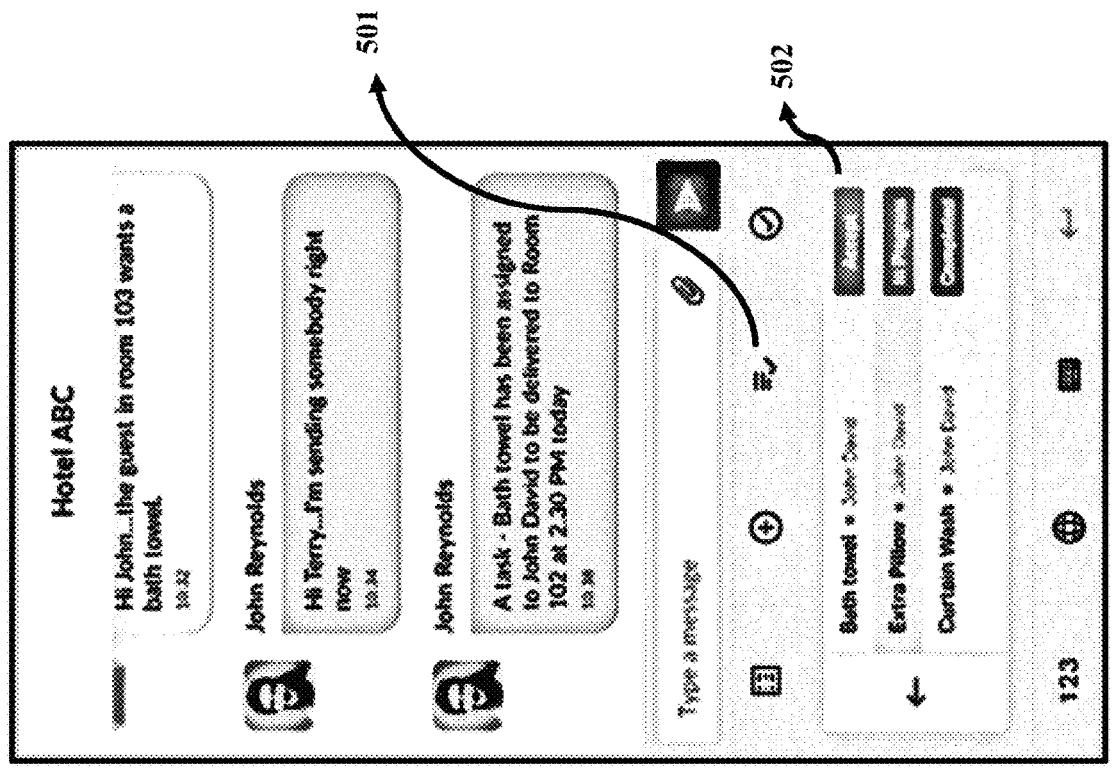
Figure 5C:
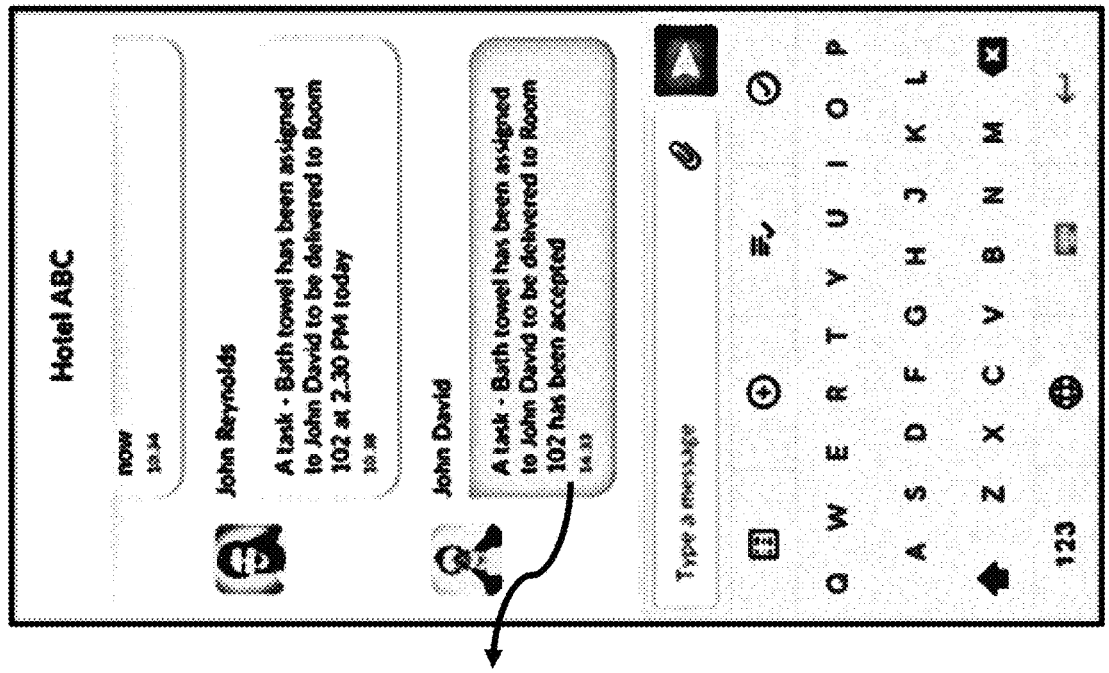

FIG. 5 is an example of a method which allows for a keyboard application, which is executed at a computing device, to allow a user to accept a task within the soft keyboard of the keyboard application.

In response to a request in the messaging application, that a task has been assigned, the user clicks on the task management element 501 of the soft keyboard 102. In response to receiving the indication of the selection of the task management element, the keyboard application will output, for display within the soft keyboard 102, in place of at least a portion of the plurality of the keys, a clickable region 502 where the user can click to accept the task. There can be other examples where the keyboard application needs to reconfigure the keyboard 102 in a way to fit in any other specific form of input or displaying the results of the input.

In response to clicking the clickable element 502, the status of task is changed to "In progress" 503 or other similar words in the Task management application which can be within the keyboard application, in a separate task management application in the same computing device or in a task management application in a remote computing device. At the same time, a message may be formed in the text edit region 101 detailing the exact event that has been triggered in the task management application for the user to send to user(s) of a CA. If the user chooses to send the message from the CA 504, the message is now seen by the user(s) of the CA that a task has been accepted and is in progress.

A message may be automatically formed in the text edit region 101 in every case, whenever a task event is triggered, which explains the details and contents of that triggered task action. However, this automatic formation of the message may be suppressed based on user or application level configurations.

Figure 6A:
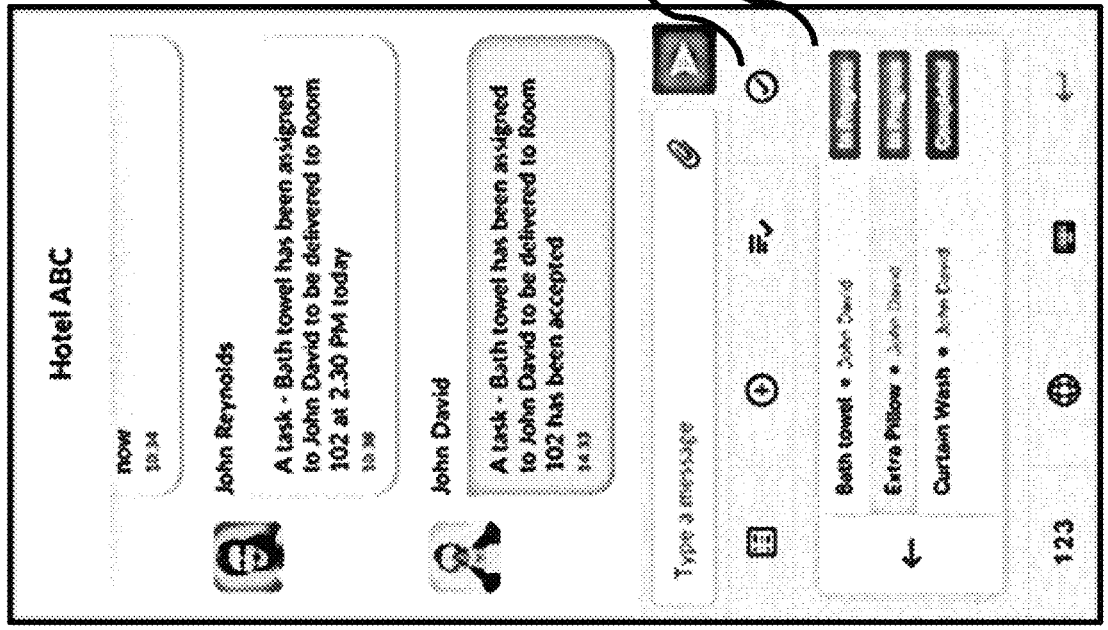
FIGS. 6A-6C, collectively "FIG. 6", are conceptual sequential screen layouts illustrating an example computing device that is configured to present a soft keyboard with task management features, which illustrates the process of completing a task, in accordance with one or more aspects of the present disclosure.
Figure 6B:
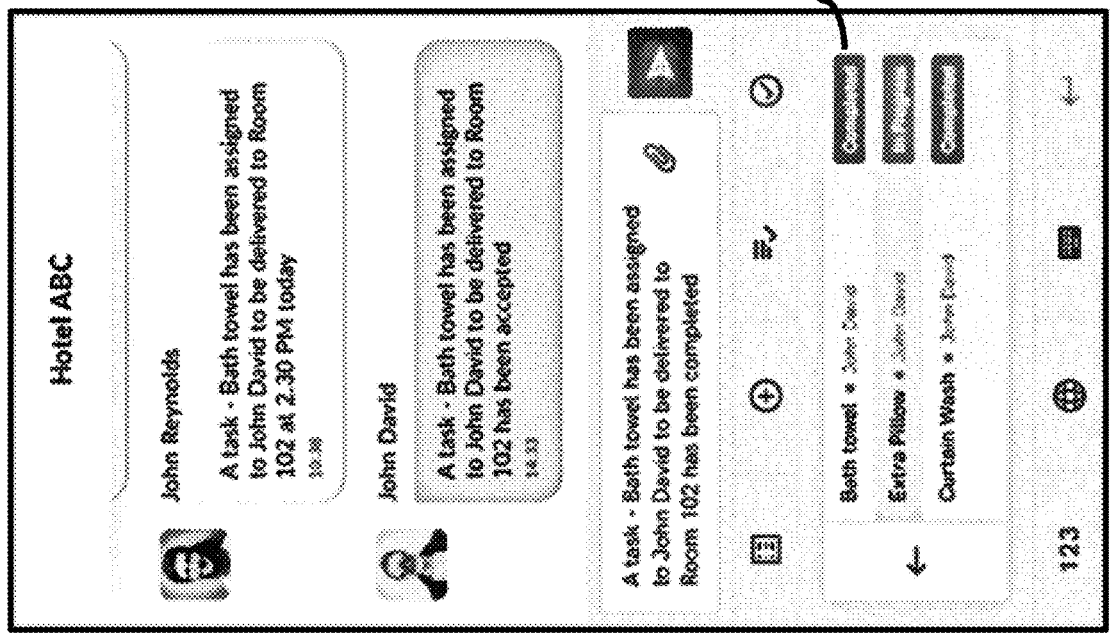
Figure 6C:
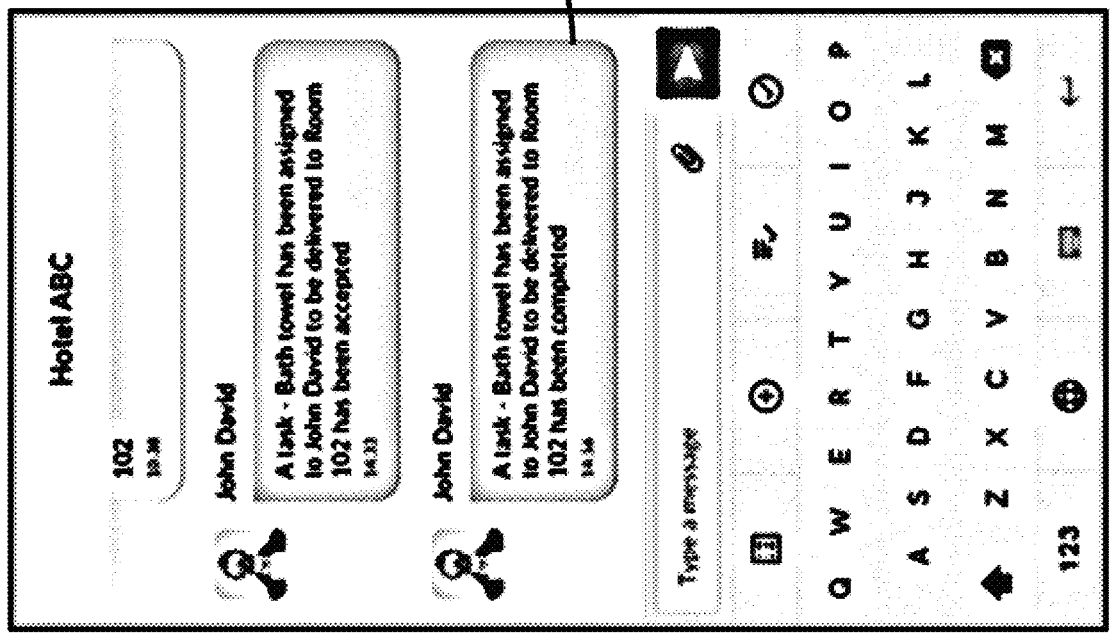
Figure 7B:
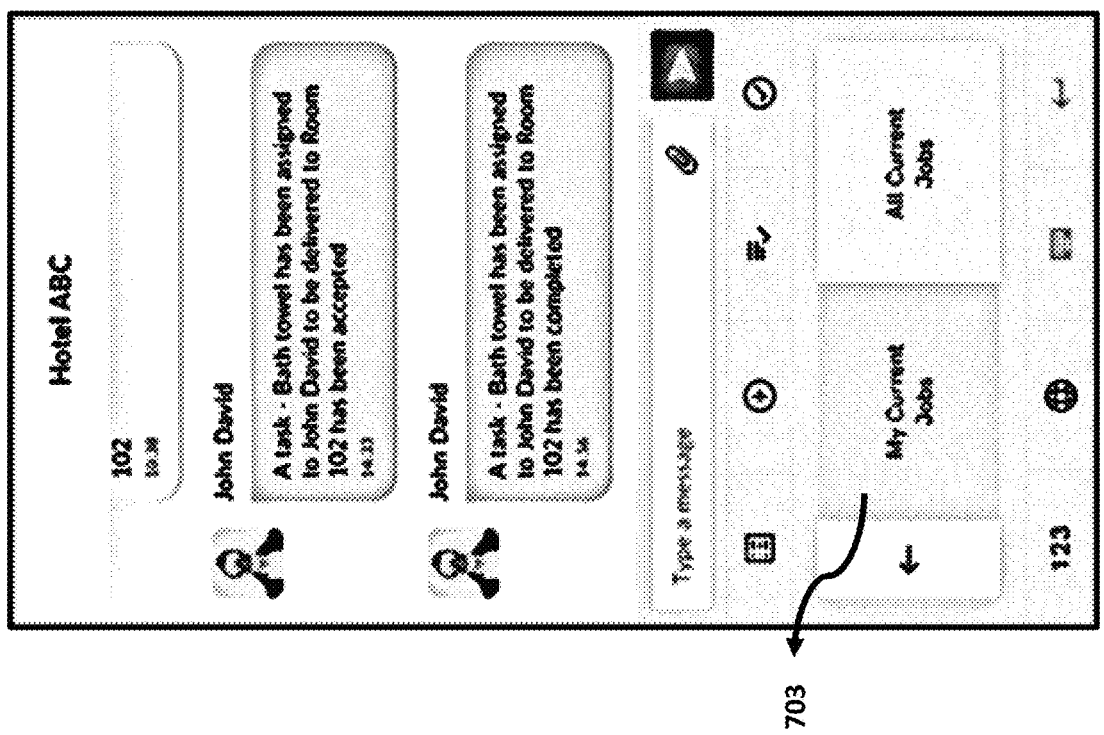
FIGS. 7A-7G, collectively "FIG. 7", are conceptual sequential screen layouts illustrating an example computing device that is configured to present a soft keyboard with task management features, which illustrates the process of reassigning a task, in accordance with one or more aspects of the present disclosure.
Figure 7A:
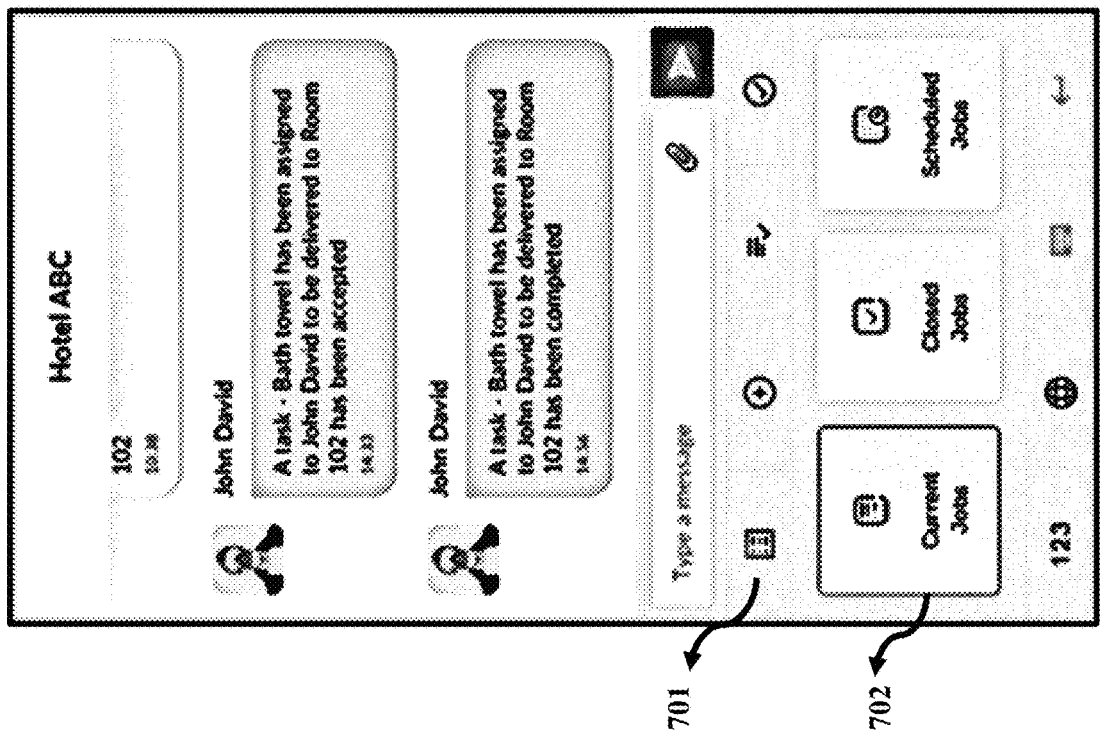
Figure 7D:
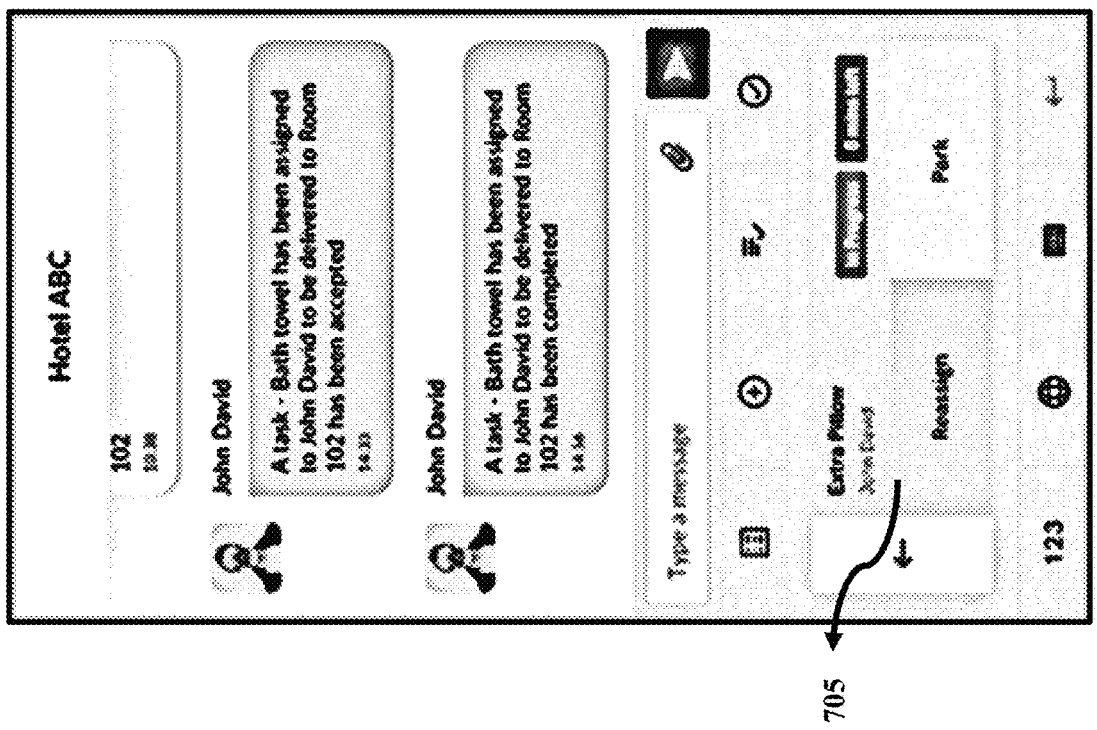
Figure 7C:
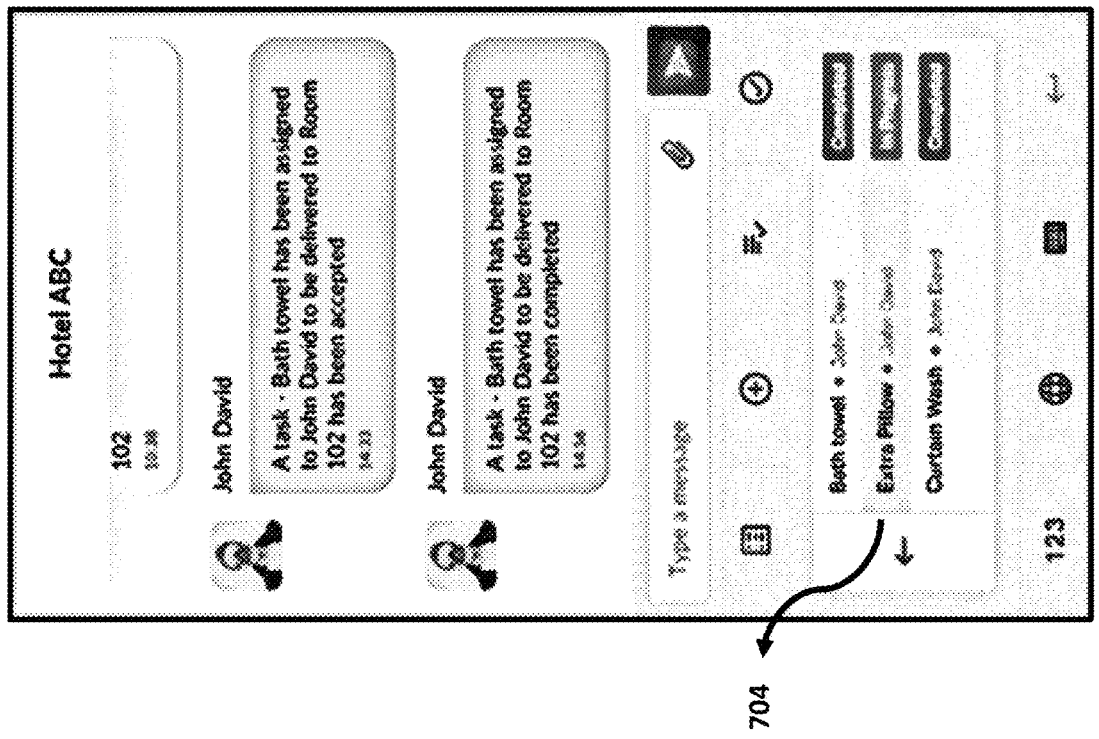
Figure 7F:
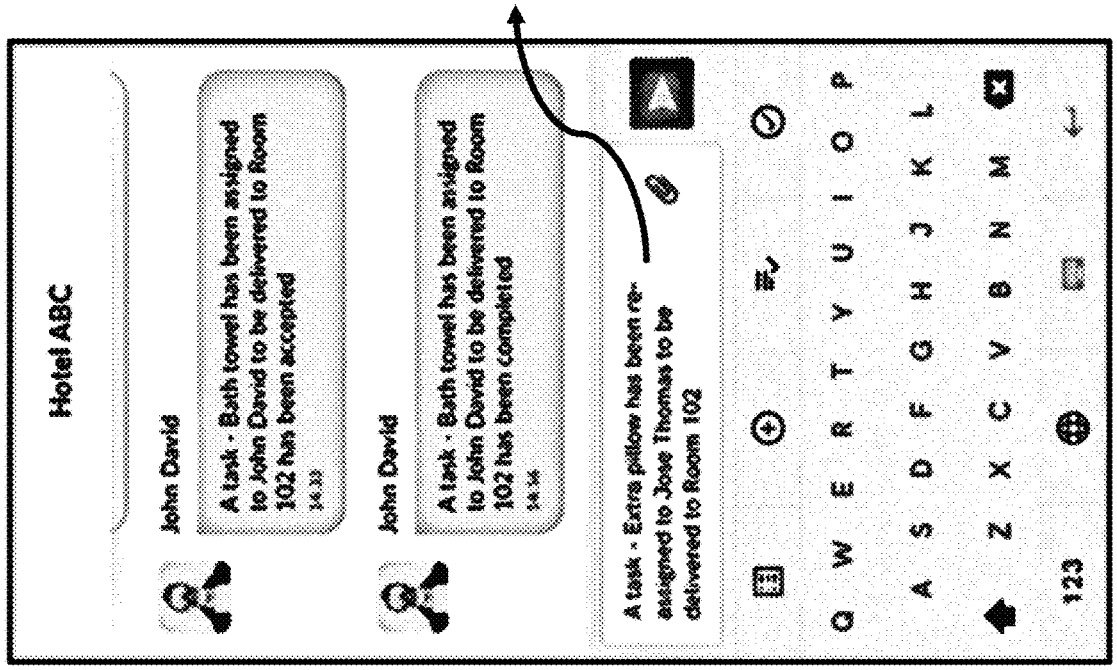
Figure 7E:
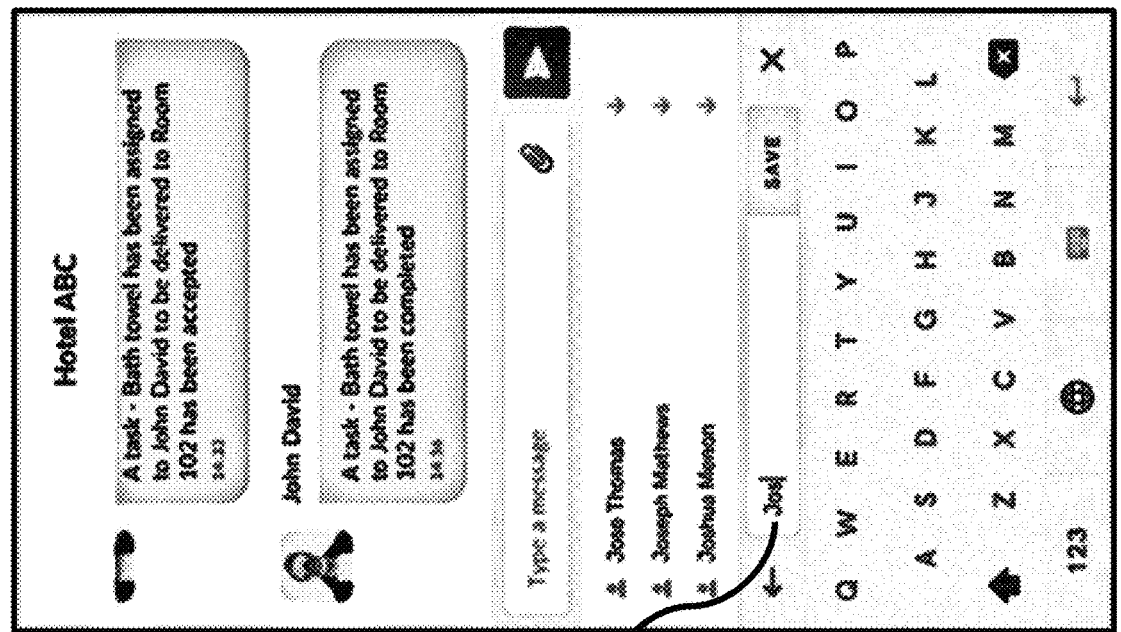
Figure 8A:
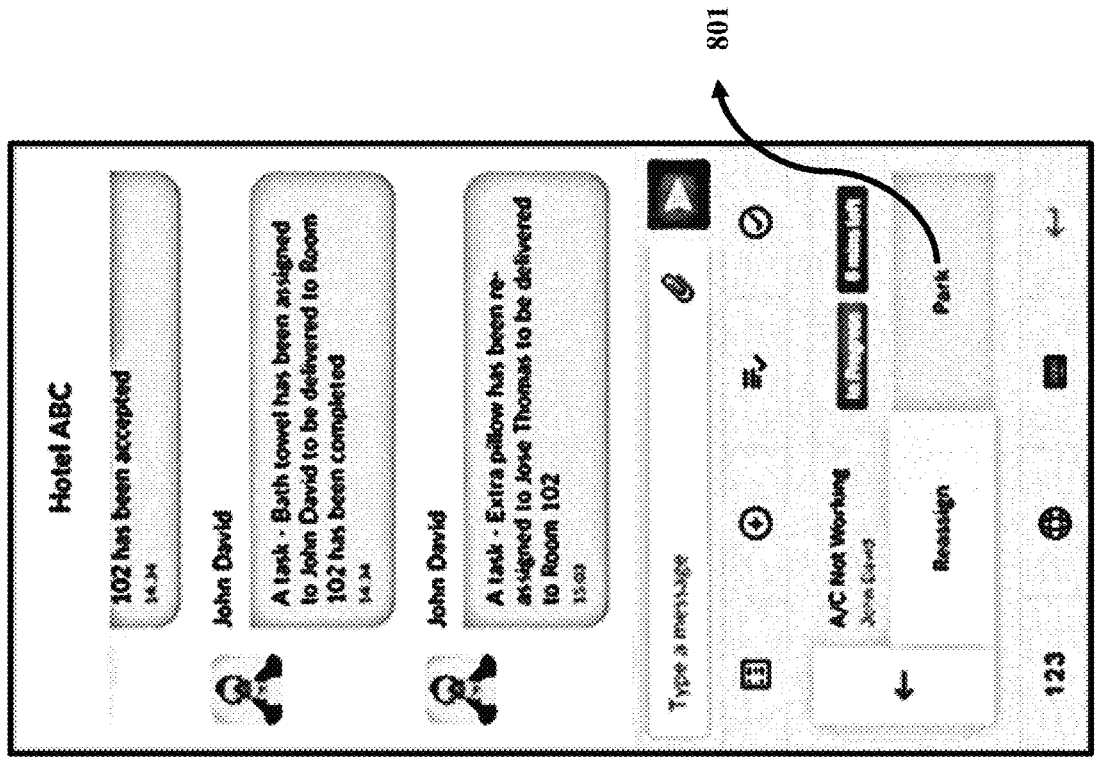
FIGS. 8A-8E, collectively "FIG. 8", are conceptual sequential screen layouts illustrating an example computing device that is configured to present a soft keyboard with task management features, which illustrates the process of parking a task, in accordance with one or more aspects of the present disclosure.
Figure 7G:
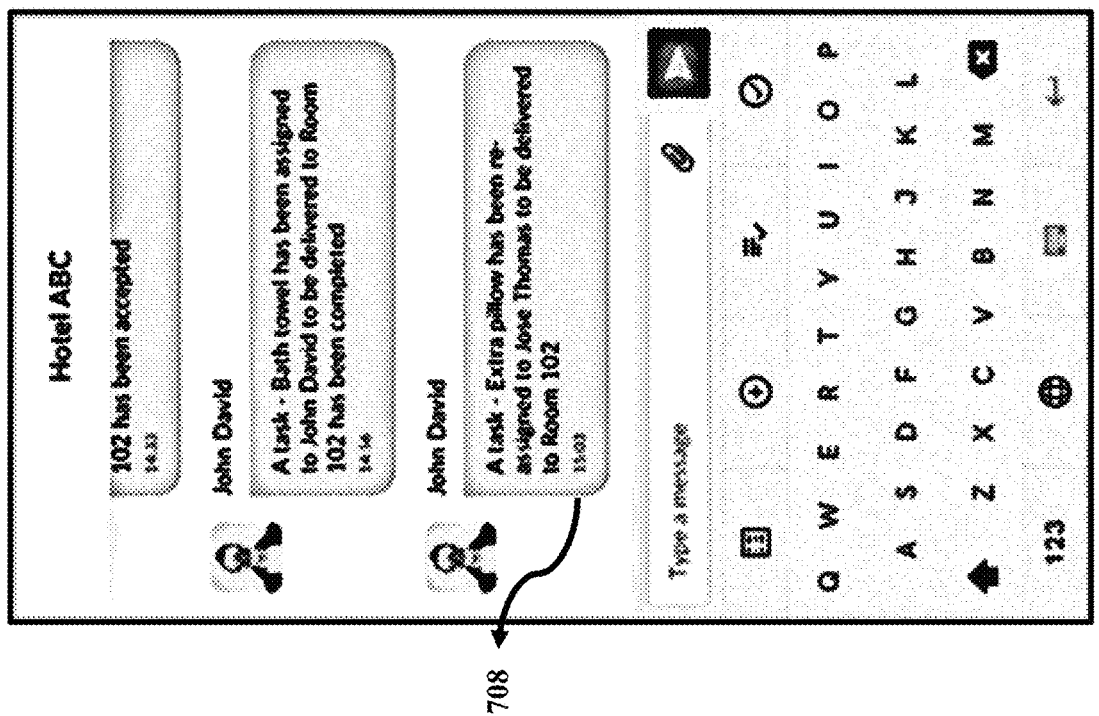
Figure 8C:
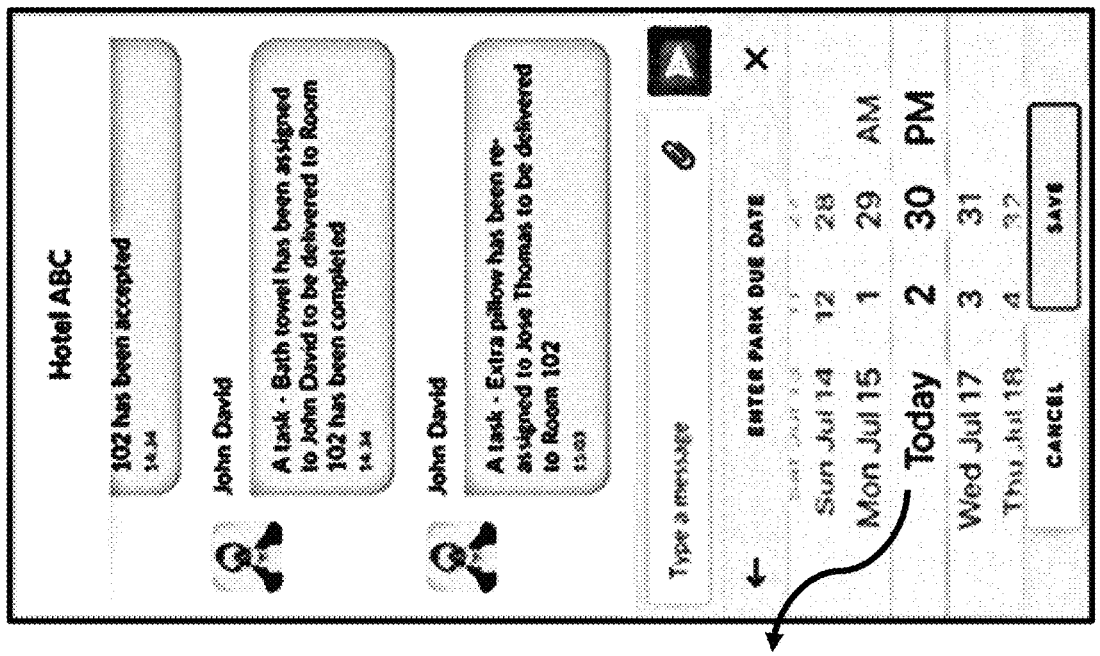
Figure 8B:
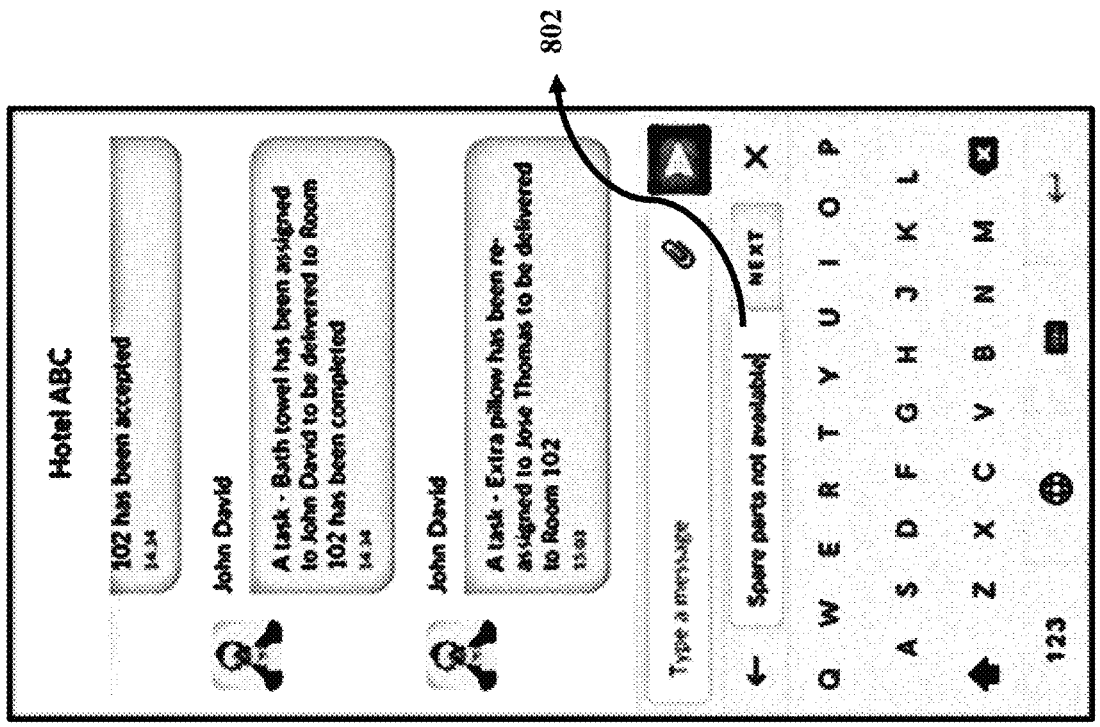
Figure 8E:
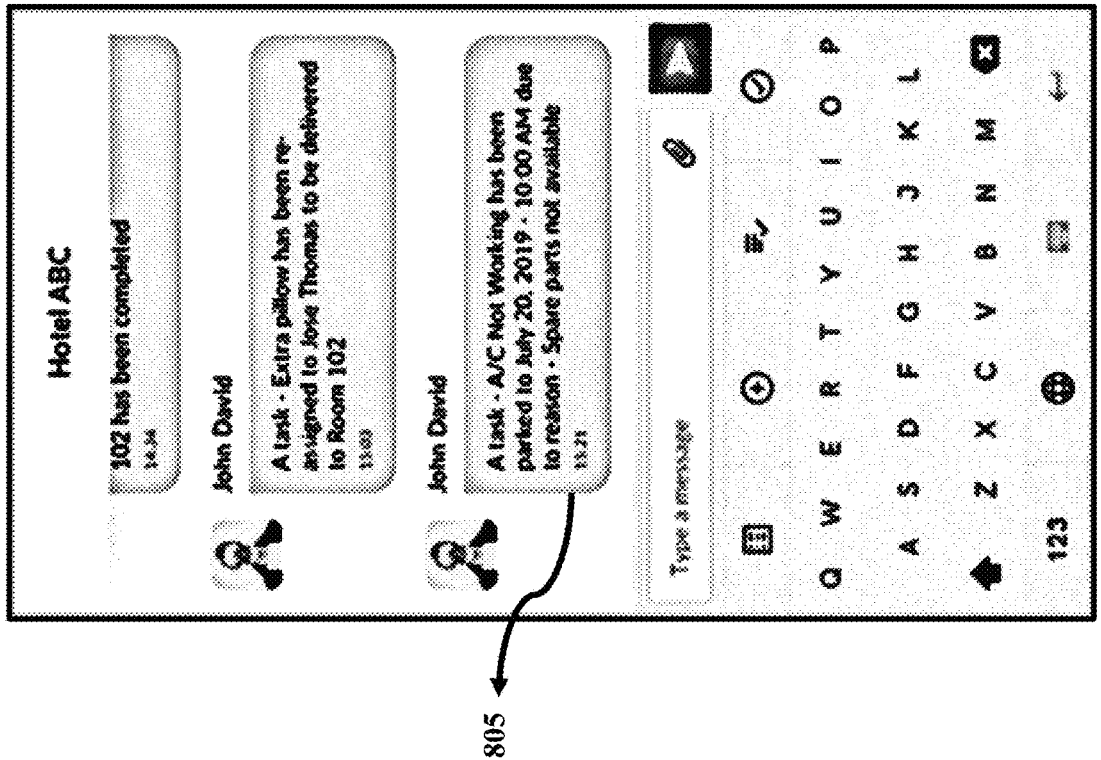
Figure 8D:
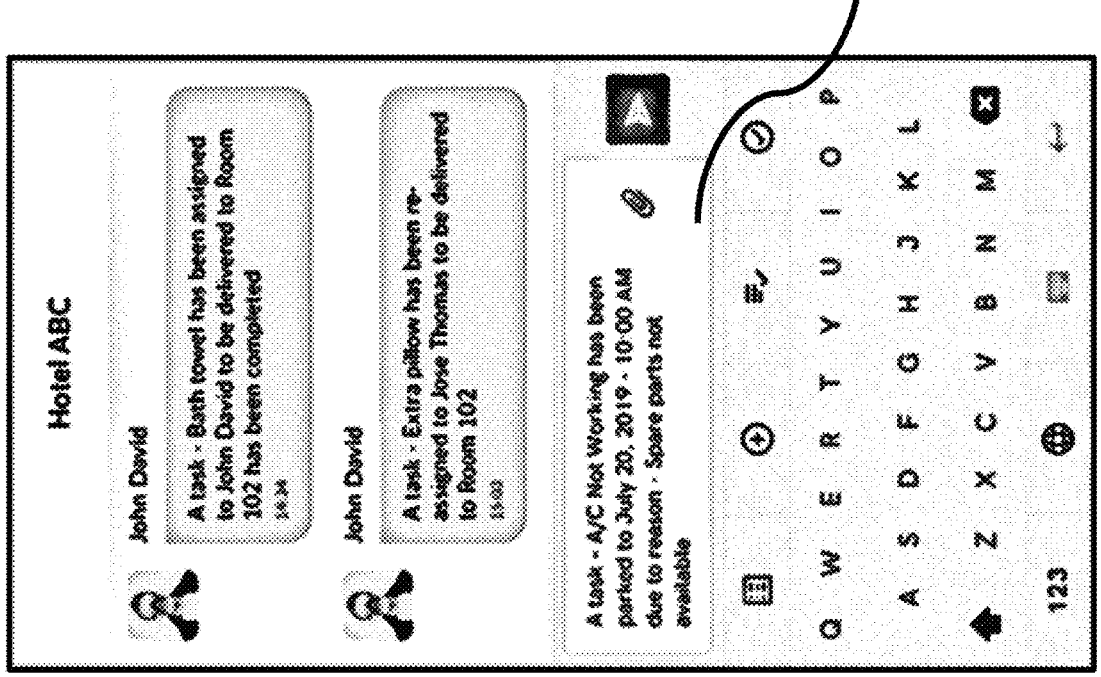

FIG. 6 is an example of a method which allows for a keyboard application, which is executed at a computing device, to allow a user to complete a task within the soft keyboard of the keyboard application.

In response to a request in the messaging application, that a task has been accepted, the user clicks on the task management element 601 of the soft keyboard 102. In response to receiving the indication of the selection of the task management element, the keyboard application will output, for display within the soft keyboard 102, in place of at least a portion of the plurality of the keys, a clickable region 602 where the user can click to complete the task. There can be other examples where the keyboard application needs to reconfigure the keyboard 102 in a way to fit in any other specific form of input or displaying the results of the input.

In response to clicking the clickable element 602, the status of task is changed to "Completed" 603 or other similar words in the Task management application which can be within the keyboard application, in a separate task management application in the same computing device or in a task management application in a remote computing device. At the same time, a message may be formed in the text edit region 101 detailing the exact event that has been triggered in the task management application for the user to send to user(s) of a CA. If the user chooses to send the message from the CA 604, the message is now seen by the user(s) of the CA that a task has been completed.

A message may be automatically formed in the text edit region 101 in every case, whenever a task event is triggered, which explains the details and contents of that triggered task action. However, this automatic formation of the message may be suppressed based on user or application level configurations.

FIGS. 7 and 8 is an example of a method which allows for a keyboard application, which is executed at a computing device, to allow a user to reassign or park for a future date, a task within the soft keyboard of the keyboard application.

In response to a request in the messaging application, that a task has been accepted, the user clicks on the task management element 701 of the soft keyboard 102. In response to receiving the indication of the selection of the task management element, the keyboard application will output, for display within the soft keyboard 102, in place of at least a portion of the plurality of the keys, a clickable region 702 where the user can click to view all the tasks which haven't been completed. There can be other examples where the keyboard application needs to reconfigure the keyboard 102 in a way to fit in any other specific method of displaying the results of the input.

In response to clicking the clickable element 702, the keyboard application will output, for display within the soft keyboard 102, in place of at least the plurality of the keys, a view, for example, where the user can determine whether the next view should be limited to the users tasks only or whether all the tasks currently outstanding should be displayed. If the user, for example, chooses clickable element 703, the keyboard application will output, for display within the soft keyboard 102, in place of at least the plurality of the keys, the list of all the users tasks 704. By clicking on any of the tasks from this list, will present a new view in place of the old view, the list of actions that is possible on that job. In the example shown, the user has two options in the view—Reassign a task 705 or Park a task for a future date 801.

By clicking on task element 705, the keyboard application will output, for display within the soft keyboard 102, a user input region 706 to input the name of the person to whom the task needs to be reassigned, within the soft keyboard 102 and in place of at least a portion of the plurality of keys. There can be other examples where the parameters for reassignment can require multiple inputs rather than a single input. Once the reassignment to an alternative user is chosen, the user can save the data by clicking on "Save" or a similar button, which is also visible next to the user input region. At the same time, a message may be formed in the text edit region 707 detailing the exact event that has been triggered in the task management application for the user to send to user(s) of a CA. If the user chooses to send the message from the CA 708, the message is now seen by the user(s) of the CA that a task has been reassigned.

By clicking on task element 801, the keyboard application will output, for display within the soft keyboard 102, a user input region 802 to input, for example, the reason why the task has been parked or postponed, within the soft keyboard 102 and in place of at least a portion of the plurality of keys. Once the reason for parking the job is specified, the user goes to the next view by clicking on "Next" or a similar button, which is also visible next to the user input region, leading the keyboard application to output, for display within the soft keyboard 102, in place of at least the plurality of the keys, a calendar view 803 which allows the user to select a day and time to postpone the task till. Once the time and date is selected, the user goes to the next view by clicking on "Save" or a similar button, which is also visible within the calendar view region 803. There can be other examples where the parameters for parking or postponing a task can require multiple inputs rather than a single input. At the same time, a message may be formed in the text edit region 804 detailing the exact event that has been triggered in the task management application for the user to send to user(s) of the CA. If the user chooses to send the message from the CA 805, the message is now seen by the user(s) of the CA that a task has been parked or postponed.

In other examples, the task management examples described in FIG. 4, FIG. 5, FIG. 6, FIG. 7 and FIG. 8 may be modified or enhanced to ensure that the user is able to configure choices as per custom requirements so as to help make the users overall task management process more efficient.

Moreover, examples provided in FIG. 4, FIG. 5, FIG. 6, FIG. 7 and FIG. 8 should not be considered as exhaustive list of possible examples where the task management feature of the keyboard can help manage tasks of any user. There can be other examples which requires task to be managed within a CA and these illustrations should not be taken as an exhaustive list of all possible methods of how a keyboard application with task management features can help a user.

Figure 9:
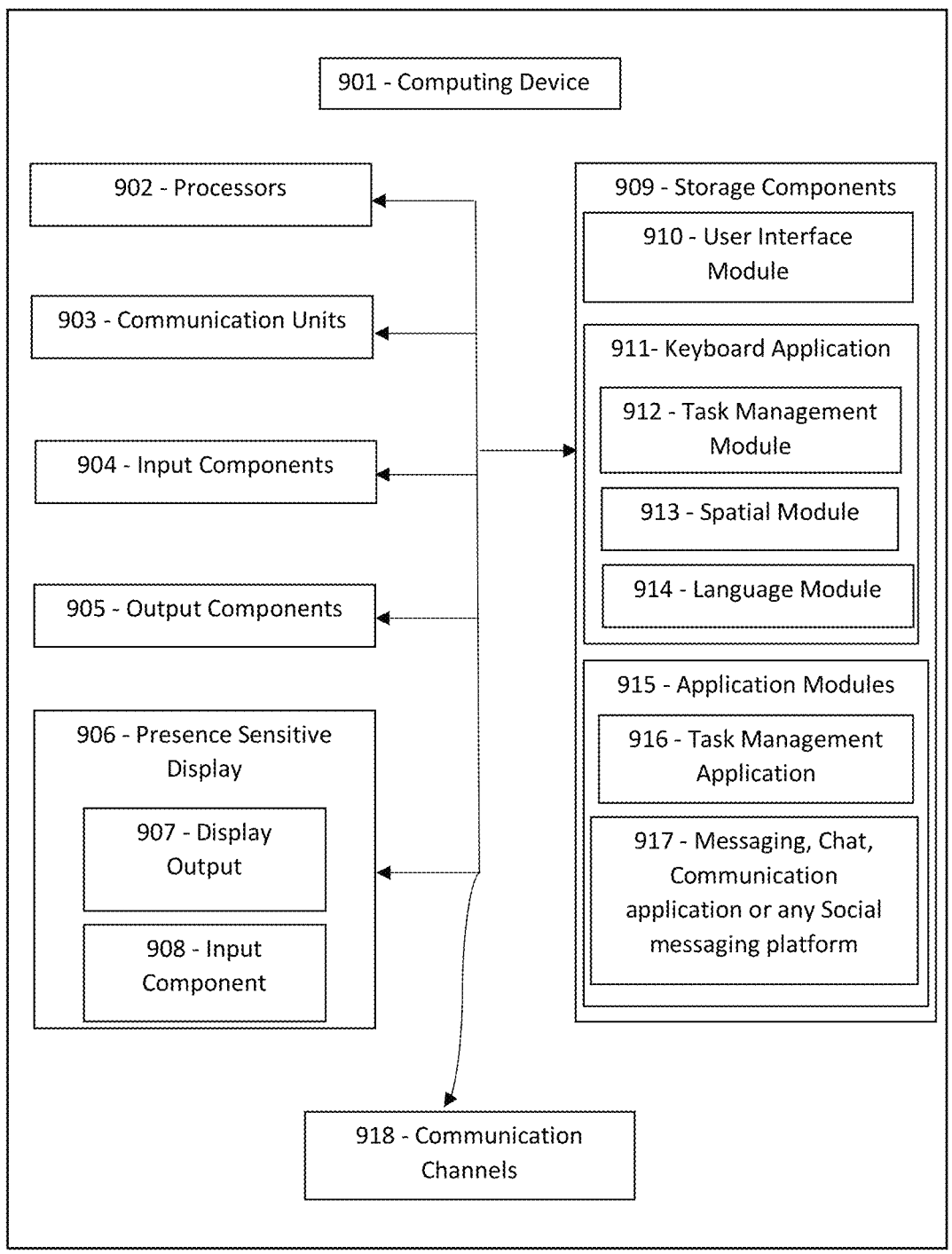
FIG. 9 is block diagram illustrating an example computing device that is configured to present a soft keyboard with task management features, in accordance with one or more aspects of the present disclosure.

FIG. 9 is a conceptual diagram illustrating an example of how a computing device 901 is configured to output a soft keyboard with task management features, in accordance with one or more aspects of the present disclosure. This illustrates only one particular example of a computing device 901, and many other examples of computing device 910 may be used in other instances and may include a subset of the components included in example computing device 901 or may include additional components not shown in FIG. 9.

Computing device 901 may represent a mobile device, such as a smart phone, a tablet computer, a laptop computer, computerized watch or any other type of portable computing device. Additional examples of computing device 901 include desktop computers, televisions or any other type of non-portable computing devices that may output a graphical keyboard for display.

Computing device 901 may include processors 902, communication units 903, input components 904, output components 905, presence-sensitive display (PSD) 906, storage components 909, a keyboard application 911, application modules 915 and communication channels 918. Storage components 909 of computing device 901 include UI module 910, keyboard application 911, and one or more application modules 915. Keyboard application 911 may include task management module 912, spatial model module 913 and language model module 914. Application modules 915 may include a task management application 916 and CA 917. Communication channels 918 may interconnect the above described components for inter-component communications or any other method for communicating data. Modules 910 and 911 may perform operations using software, hardware, firmware, or a mixture of hardware, software, and firmware residing in and/or executing at computing device 901

PSD 906 of computing device 901 may function as input 907 and/or output devices 908 for computing device 901. PSD 906 may be implemented using various technologies which operate as presence-sensitive input screens and as well as capable of outputting visible information to a user of computing device 901.

One or more communication units 903 of computing device 901 may communicate with external devices via one or more wired and/or wireless networks by transmitting and/or receiving network signals on the one or more networks. One or more input components 904 of computing device 901 may receive input from any type of source or form. One or more output components 905 of computing device 901 may generate output. It may include any type of device which generates output to a human or machine including at a location near the screen or surface at which PSD 906 outputs information for display. The input and the output components can be an external component of computing device 901 located outside and physically separated from the packaging or housing of computing device 901.

One or more processors 902 may implement functionality and/or execute instructions associated with computing device 901. The modules described in FIG. 9 may be operable by processors 902 to perform various actions, operations, or functions of computing device 901.

One or more storage components 909 within computing device 901 may store information for processing during operation of computing device 901. In some examples, storage component 909 is a temporary memory, meaning that a primary purpose of storage component 909 is not long-term storage. Storage components 909 on computing device 901 may be configured for short-term storage of information as volatile memory and therefore not retain stored contents if powered off. Storage components 909 may further be configured for long-term storage of information as non-volatile memory space and retain information after power on/off cycles. Storage components 909 may store program instructions and/or information associated with the other modules of computing device 901.

UI module 910 manages user interactions with PSD 906 and other components of computing device 901. In other words, UI module 910 may act as an intermediary between various components of computing device 901 to make determinations based on user input detected by PSD 906 and generate output at PSD 906. UI module 910 may manage inputs received by computing device 901 as a user views and interacts with the user interface presented at PSD 906 and update the user interface in response to receiving additional instructions from the application, service, platform, or other module of computing device 901 that is processing the user input. UI module 910 may send an indication of the one or more touch events to keyboard application 911 for further interpretation. Keyboard application 911 may determine, based on the touch events received from UI module 910, that the detected user input represents an initial selection of one or more keys of the soft keyboard.

Application modules 915 represent all the various individual applications and services executing at and accessible from computing device 901 that may rely on a soft keyboard having task management features.

Keyboard application 911 represents an application, service, or component executing at or accessible to computing device 901 that provides computing device 901 with a soft keyboard having task management features. Keyboard application 911 may switch between operating in text-entry mode in which keyboard application 911 functions similar to a traditional graphical keyboard, or task management mode in which keyboard application 911 performs various task management functions or interfaces with one or more task management applications or functionality. In some examples, keyboard application 911 may be a stand-alone application, service, or a module executing at computing device 901. In other examples, keyboard application 911 may be a sub-component or extension acting as a service for other applications or device functionality. As another example, keyboard application 911 may be a stand-alone application or subroutine that is invoked by an application or operating platform of computing device 901 any time an application or operating platform requires graphical keyboard input functionality. In some examples, computing device 901 may download and install keyboard application 911 from an application repository of a service provider. In other examples, keyboard application 911 may be preloaded during production of computing device 901. Keyboard application 911 may include various submodules, such as Task Management Module 912, Spatial module 913 and Language Module 914.

Spatial module 913 may receive one or more touch events as input, and output a character or sequence of characters that likely represents the one or more touch events. The Spatial module 913 may infer touch events as a selection of one or more keys of a keyboard and may output, based on the selection of the one or more keys, a character or sequence of characters.

The lexicon of computing device 901 may include a list of words within a dictionary. The Language module 914 may perform a lookup in the lexicon, of a character string, to identify one or more letters, words, and/or phrases that include parts or all of the characters of the character string. In response to determining the one or more candidate words, the Language module 914 may output the one or more candidate words from the lexicon as suggestions in the text input region 101.

The Task management module 912 of keyboard application 911 may perform task management functions as explained in FIGS. 1, 2, 3, 4, 5, 6, 7 and 8.

Figure 10:
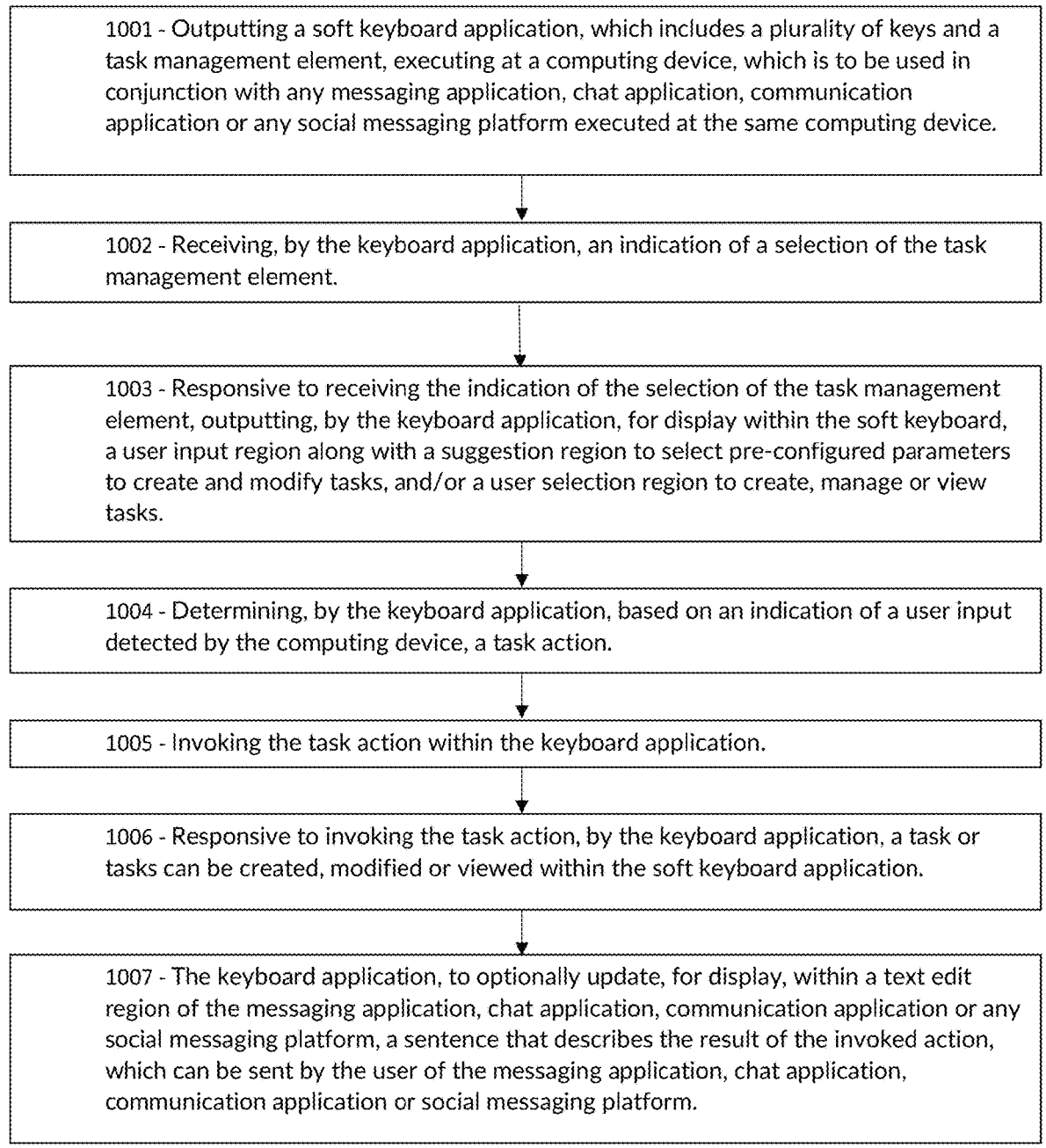
FIG. 10 is a flowchart illustrating example operations of a computing device that is configured to present a soft keyboard with task management features, in accordance with one or more aspects of the present disclosure.

FIG. 10 is a flowchart illustrating example operations of a computing device that is configured to present a soft keyboard with task management features, in accordance with one or more aspects of the present disclosure. The operations of FIG. 10 may be performed by one or more processors of a computing device, such as computing devices 901 of FIG. 9. For purposes of illustration only, FIG. 10 is described below within the context of computing devices 901 of FIG. 9.

1001—In operation, keyboard application 911 of computing device 901 may output a graphical keyboard 102 that includes plurality of keys 104 and task management element 103, which is to be used in conjunction with any CA executed at the same computing device. In other examples, the soft keyboard 102 may be sometimes presented by the CA as an alternative to the traditional keyboard.

1002—The keyboard application 911 may receive an indication of a selection of the task management element 103;

1003—In response to receiving the indication of the selection of the task management element 103, outputting, by the keyboard application, for display within the soft keyboard, a user input region 106 to create and manage tasks. In some examples, the keyboard application 911 may replace the traditional keyboard with a selection region 107 through which the user can do further operations to manage and view tasks of the task management application. In other examples, it may also include a suggestion region 105 from a list which has already been pre-configured within a task management application within the keyboard, a different task management application executed at the same computing device 901 or a remote task management system.

1004—The keyboard application 911 may determine a task action, based on an indication of a user input detected by the computing device. For example, the user may create a task by entering details in the input region 106 and choosing the pre-configured task management parameters from the suggestion region 105. In other examples, the user may edit a task by selecting options from selection region 107, entering details in the input region 106 and by choosing the pre-configured task management parameters from the suggestion region 105. The task action will be determined by any form of combinations of data input and/or selection from the input region 106, choosing the pre-configured parameters from the suggestion region 105 or by selecting options from selection region 107. There can be more forms of data input/selection from the area representing the soft keyboard 102 to allow for faster and more efficient methods of data entry.

1005—The Keyboard application 911 will then invoke the task action in the task management application within the keyboard, or a different task management application executed at the same computing device 901, or a remote task management system.

1006—In response to invoking the task action, by the keyboard application 911, a task is created or within the keyboard application or a different task management application executed at the same computing device 901, or a remote task management system. In other examples, tasks may be viewed within the soft keyboard application 911.

1007—The keyboard application 911, may optionally update, for display, within a text edit region of the of the CA, a sentence that describes the result of the invoked action, which can be sent by the user of the CA.

There have been references made throughout this disclosure to various examples. Usage of such phrases may refer to more than just one example. Furthermore, the described features, structures, or characteristics may be combined in any suitable manner in one or more examples. These examples may be relevant without one or more of the specific details, or with other methods, resources, materials, etc. In other instances, well known structures, resources, or operations have not been shown or described in detail.

While sample examples and applications have been illustrated and described, it is to be understood that the examples are not limited to the precise configuration and resources described above. Various modifications, changes, and variations may be made in the arrangement, operation, and details of the methods and systems disclosed herein without departing from the scope of the claimed examples.

What is claimed is:

1. A method comprising:
invoking a soft keyboard application to be executed on a computing device by a first application after a user selects a text input field on a presence-sensing screen for entering text into the first application, the first application being different from the soft keyboard application and a task management application;
displaying, by the soft keyboard application, a soft keyboard on the presence-sensing screen, the soft keyboard including a plurality of keys for communicating with a text edit region and row of task management function keys adjacent to the plurality of keys, the plurality of keys configured to create text to be inserted into the text input field of the first application while in a text entry mode and the task management function keys configured to toggle the soft keyboard into a task management mode corresponding to a selected function of the task management function keys, wherein the soft keyboard in the task management mode is configured to communicate with the task management application executed in the computing device or a remotely accessed computer device;
receiving from the user the selected function of the task management keys detected through the presence-sensing screen, by the soft keyboard application;
responsive to receiving the selected function, displaying within the soft keyboard a task management region corresponding to the selected function, the task management region being an interface to receive user task instructions to perform the selected function in the task management application on a task comprised of a plurality of task parameters without switching out of the first application and at least two of the selectable task parameters are selected from a displayed group of a task owner, a task description, a task location, a task due date and a completion progress of the task;
receiving through the presence-sensing screen in the task management region the user's inputted task instruction;
updating, by the soft keyboard application, the task in the task management application based on the user's inputted task instruction; and
displaying in the text input field of the first application at least some of the selected task parameters of the updated task.

2. The method of claim 1, wherein typing on the plurality of keys, when present in the task management mode, communicates with the task management region to input text into a second text edit region within the task management region.

3. The method of claim 1, wherein the task management region is displayed in place of all the plurality of keys, all of the task management function keys, or all of the text keys of the plurality of keys.

4. The method of claim 1, wherein the soft keyboard application is downloaded from an online application store.

5. The method of claim 1, further comprising prompting the user in the task management region about whether to display only the tasks of the user or the tasks of all task owners from within a set of tasks in the task management application.

6. The method of claim 5, wherein responsive to prompting the user and receiving the user's choice, displaying the task owner and a completion progress for the chosen tasks to be displayed.

7. The method of claim 1, further comprising receiving, by the soft keyboard application, a swipe gesture initiated on a list of tasks displayed in the task management region; and
displaying within the task management region, by the soft keyboard application, in place of the list of tasks, an additional list of tasks.

8. The method of claim 1, further comprising displaying the task parameters of the task in the task management region and prompting the user to choose to reassign or postpone the task.

9. The method of claim 8, further comprising, after updating the task in the task management application, toggling the soft keyboard into the text entry mode and entering, by the soft keyboard application, task parameters of the updated task including the postponement reason in the text edit region.

10. A method comprising:
invoking, from within a first application that presented a user with a text input field and after a user selects the text input field on a presence-sensing screen the first application is configured to invoke a virtual keyboard and then receive text from the user's interactions with the virtual keyboard, the execution of a soft keyboard application on a computing device, the first application being different from the soft keyboard application and a task management application;
displaying, by the soft keyboard application, a soft keyboard on the presence-sensing screen, the soft keyboard including a plurality of keys for communicating with a text edit region and row of task management function keys adjacent to the plurality of keys, the plurality of keys configured to create text to be inserted into the text input field of the first application while in a text entry mode and the task management function keys configured to toggle the soft keyboard into a task management mode corresponding to a selected function of the task management function keys, wherein the soft keyboard in the task management mode is configured to communicate with the task management application executed in the computing device or a remotely accessed computer device;
receiving from the user the selected function of the task management keys detected through the presence-sensing screen, by the soft keyboard application;
responsive to receiving the selected function, displaying within the soft keyboard a task management region corresponding to the selected function, the task management region being an interface to receive user task instructions to perform the selected function in the task management application on a task comprised of a plurality of task parameters without switching out of the soft keyboard application or the first application and at least two of the task parameters are selected from the group of a task owner, a task description, a task location, a task due date and a completion progress of the task;
receiving through the presence-sensing screen in the task management region the user's inputted task instruction; and
updating, by the soft keyboard application, the task in the task management application based on the user's inputted task instruction, wherein displaying the task management region includes displaying a second text input region in place of the row of task management function keys while the text input field of the first application is still shown, and wherein receiving the user's inputted task instruction is inputted by the user typing an instruction on the plurality of keys into the second text input region through the plurality of keys.

11. The method of claim 10, further comprising displaying on the soft keyboard a suggestion region with suggestions for one of the task parameters generated from lists of the task management application based upon the selected function and text being entered into the second text input region.

12. The method of claim 11, wherein the displaying of the suggestion region on the soft keyboard causes the soft keyboard to enlarge and a displayed portion of the first application to shrink on the presence-sensing screen.

13. The method of claim 10, wherein the soft keyboard application is downloaded from an online application store.

14. A method comprising:

invoking, from within a first application that presented a user with a text input field and after a user selects the text input field on a presence-sensing screen the first application is configured to invoke a virtual keyboard and then receive text from the user's interactions with the virtual keyboard, the execution of a soft keyboard application on a computing device, the first application being different from the soft keyboard application and a task management application;

displaying, by the soft keyboard application, a soft keyboard on the presence-sensing screen, the soft keyboard including a plurality of keys for communicating with a text edit region and row of task management function keys adjacent to the plurality of keys, the plurality of keys configured to create text to be inserted into the text input field of the first application while in a text entry mode and the task management function keys configured to toggle the soft keyboard into a task management mode corresponding to a selected function of the task management function keys, wherein the soft keyboard in the task management mode is configured to communicate with the task management application executed in the computing device or a remotely accessed computer device;

receiving from the user the selected function of the task management keys detected through the presence-sensing screen, by the soft keyboard application;

responsive to receiving the selected function, displaying within the soft keyboard, a task management region corresponding to the selected function, the task management region being an interface to receive user task instructions to perform the selected function in the task management application on a task comprised of a plurality of task parameters without switching out of the first application and at least two of the task parameters are selected from the group of a task owner, a task description, a task location, a task due date and a completion progress of the task;

receiving through the presence-sensing screen in the task management region the user's inputted task instruction; and updating, by the soft keyboard application, the task in the task management application based on the user's inputted task instruction, wherein, in response to the task being assigned to a task owner by the user, displaying in the task management region a clickable region configured to receive an indication from the task owner of the task owner's acceptance or completion of the task in a separate instance of the soft keyboard application on a device of the task owner in the task owner's task list that was populated through communication of the separate instance with the task management application.

15. The method of claim 14, further comprising pressing by the task owner on the clickable region to indicate accept the task and updating the task management application to indicate that the task has been accepted by the task owner.

16. The method of claim 14, further comprising pressing by the task owner on the clickable region to complete the task and updating the task management application to indicate that the task has been completed by the task owner.

17. The method of claim 14, wherein the task management region is displayed in place of all the plurality of keys, all of the task management function keys, or all of the text keys of the plurality of keys.

18. The method of claim 14, wherein typing on the plurality of keys, when present in the task management mode, communicates with the task management region to input text into a second text edit region within the task management region.

19. The method of claim 14, wherein the soft keyboard application is downloaded from an online application store.

20. The method of claim 1, wherein the task is a physical action to be executed by a person outside of the computing device.

* * * * *